United States Patent
Coughenour et al.

(10) Patent No.: US 10,942,423 B1
(45) Date of Patent: Mar. 9, 2021

(54) LIGHT SOURCE MODULE WITH ADJUSTABLE FOCUS

(71) Applicant: Apple Inc., Cupertino, CA (US)

(72) Inventors: Blake M. Coughenour, Cupertino, CA (US); Hossein Nemati, Cupertino, CA (US); Florian R. Fournier, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 15/994,948

(22) Filed: May 31, 2018

Related U.S. Application Data

(60) Provisional application No. 62/521,221, filed on Jun. 16, 2017.

(51) Int. Cl.
*G03B 15/06* (2006.01)
*H04N 5/235* (2006.01)
*G03B 15/05* (2021.01)

(52) U.S. Cl.
CPC ............. *G03B 15/06* (2013.01); *G03B 15/05* (2013.01); *H04N 5/2354* (2013.01); *G03B 2215/0528* (2013.01)

(58) Field of Classification Search
CPC .................................. G03B 15/05; G03B 15/06
See application file for complete search history.

(56) References Cited

U.S. PATENT DOCUMENTS 6,184,949 B1 * 2/2001 Cornelissen ...... G02F 1/133504
349/106
7,616,881 B2 11/2009 Liang et al.
2008/0247743 A1 * 10/2008 Liang .................... G03B 15/06
396/175

(Continued)

OTHER PUBLICATIONS

Anonymous, "Total internal reflection (TIR) lens and Legacy reflector", Retrieved from URL: http://cdnassets.hw.net/dims4/GG/eaebca3/2147483647/resize/876x%3E/quality/90/?url=http%3A%2F%2Fcdnassets.hw.net%2F5b%2F54%2Ffd55d90747c189 . . . , Nov. 15, 2016, pp. 1.

(Continued)

*Primary Examiner* — Clayton E. LaBalle
*Assistant Examiner* — Dennis Hancock
(74) *Attorney, Agent, or Firm* — Robert C. Kowert; Kowert, Hood, Munyon, Rankin & Goetzel, P.C.

(57) ABSTRACT

A light source module includes an illumination element and an adjustable light diffusing material. The light source module is configured to receive or generate a control signal for adjusting diffusion of light emitted from the light source module and accordingly adjust an amount of diffusion of light emitted from the light source module. In some embodiments, an adjustable light diffusing material includes a polymer stabilized cholesteric texture (PSCT), a smectic phase liquid crystal, a polymer network liquid crystal (PNLC), or other suitable material. A controller for a light source module may determine a level of diffusion based on a level of inclusion of a wide-angle field of view of a wide-angle lens system or a telephoto field of view of a telephoto lens system in a composite camera field of view that includes a combination of the wide angle field of view and the telephoto field of view. Also, the controller may determine a level of diffusion based or an estimated distance to a scene in a camera field of view that is to be captured.

18 Claims, 19 Drawing Sheets

(56) References Cited

U.S. PATENT DOCUMENTS

| | | | |
|---|---|---|---|
| 2009/0207622 A1* | 8/2009 | Tsuboi | G02B 26/004 362/331 |
| 2010/0238344 A1* | 9/2010 | Tsai | G06F 3/0488 348/361 |
| 2012/0176663 A1* | 7/2012 | Zang | C09K 19/544 359/296 |
| 2013/0258220 A1 | 10/2013 | Uehara | |
| 2014/0063049 A1* | 3/2014 | Armstrong-Muntner | G03B 9/00 345/619 |
| 2014/0160399 A1 | 6/2014 | Yang et al. | |
| 2015/0009307 A1* | 1/2015 | Lee | G02F 1/133504 348/54 |
| 2016/0353012 A1* | 12/2016 | Kao | H04N 5/23293 |
| 2017/0024846 A1* | 1/2017 | Nash | G06T 1/20 |
| 2017/0285307 A1* | 10/2017 | Kamm | G03B 17/12 |
| 2019/0236794 A1* | 8/2019 | Nash | G06T 5/002 |

OTHER PUBLICATIONS

Anonymous, "Basics-of-opical-imaging-non-imaging-optics-15/638.jpg (638×451)", Retrieved from URL: http://image.slidesharecdn.com/basicsofopicalimaging130701042237phpapp02/95/basicsofopicalimagingnonimagingoptics15638.jpg?cb=1372653022, Nov. 15, 2016, pp. 1.

TCI, "Liquid Crystal Materials", Retrieved from URL: http://www.tcichemicals.com/eshop/en/us/category_index/00105/, Nov. 15, 2016, pp. 1-13.

Ki-Han Kim, et al, "Dual mode switching of cholesteric liquid crystal device with three-terminal electrode structure", Optics Express, vol. 20, No. 22, Oct. 22, 2012, pp. 1-6.

Hongwen Ren, et al., "Reflective reversed-mode plymer stabilized cholesteric texture light switches", Journal of Applied Physics, vol. 92, No. 2, Jul. 15, 2002, pp. 797-800.

Andy Ying-Guey Fuh, et al, "Studies of Polymer-Stabilizied Cholesteric texture films", In Display Technologies III, Proceeding of SPIE, vol. 4079, 2000, pp. 184-190.

* cited by examiner

US 10,942,423 B1

LIGHT SOURCE MODULE WITH ADJUSTABLE FOCUS

This application claims benefit of priority to U.S. Provisional Patent Application Ser. No. 62/521,221 filed on Jun. 16, 2017. The above application is incorporated herein by reference in its entirety. To the extent that any incorporated material conflicts with the material expressly set forth herein, the expressly set forth material controls.

BACKGROUND

Technical Field

This disclosure relates generally to light source modules which can emit a diffused beam of light, including, without limitation, flash modules used to illuminate subjects in images captured by a camera device.

Description of the Related Art

For small devices, including devices which include one or more miniature cameras, it is common to include a light source module, which illuminates at least a portion of a scene located within a field of view of the camera. Such cameras and light source modules can be included in a larger electronic device, including a mobile electronic device, which can include a mobile telephone, smartphone, notebook, etc.

The light source module, which may also be referred to as a "flash" module, "strobe" module, etc., can emit light which illuminates a space external to the light source module. The illuminated space may include a camera field of view, thereby illuminating subjects within the camera field of view for images of said subjects captured by the camera.

In some cases, the lighting module included in a small device includes a light source which includes an illumination element, such as a light emitting diode (LED) or laser diode. And, a diffuser may be placed adjacent to the LED so that light emitted from the LED passes through the diffuser as the light leaves the light source. The diffuser may cause the light emitted from the LED to be spread out or scattered as a result of the light passing through the diffuser as it exits the light source.

In some cases, a camera may be designed to capture images of scenes in the camera's field of view that include objects that are at various distances away from the camera, for example via a telephoto lens system or a wide-angle lens system. In some cases, a camera system may be designed to capture images of objects in a scene at a particular distance away from the camera in one of multiple camera modes, such as a wide-angle mode or a telephoto mode. Also, a camera may be designed to capture images of an object at a particular distance away from the camera in any number of multiple zoom levels supported by the camera. In such cases, a light source module that does not adjust for zoom levels, adjust for distances to objects or adjust for different camera modes may result in uneven illumination of a scene to be captured by the camera.

SUMMARY OF EMBODIMENTS

Some embodiments provide a mobile computing device which includes a camera arrangement with multiple lens systems, each having different fields of view, such as a wide-angle lens system and a telephoto lens system. A field of view of an image captured by the camera arrangement may be based on a combination of the fields of view of the different lens systems, such as a combination of a field of view of a wide-angle lens system and a field of view of a telephoto lens system. In addition, the camera arrangement may be configured to capture photos at multiple zoom levels using a combination of the different lens systems, such as a combination of the telephoto lens system and the wide-angle lens system. For example, the camera arrangement may include a camera with a telephoto lens system and another camera with a wide-angle lens system, or may include a camera configured to operate both a telephoto lens system and a wide-angle lens system to achieve intermediate optical zoom levels between a full optical wide-angle mode and a full optical telephoto mode. The mobile computing device also includes a light source module embedded in the mobile computing device or coupled with the mobile computing device. The light source module includes one or more illumination elements configured to emit light. For example, the one or more illumination elements may be one or more light emitting diodes (LEDs).

The light source module also includes an adjustable light diffusing material positioned relative to the one or more illumination elements such that light emitted from the one or more illumination elements directed towards an illumination field of the light source module can be adjusted to correspond with a field of view of the camera arrangement. The light emitted from the one or more illumination elements is diffused by the adjustable light diffusing material as the light passes through the adjustable light diffusing material. Furthermore, the mobile computing device includes a controller configured to determine an amount of diffusion to apply to light emitted from the one or more illumination elements to focus the illumination field of view such that the illumination field of view substantially matches the camera arrangement field of view. In some embodiments, a camera arrangement field of view resulting from a combination of a wide-angle field of view and a telephoto field of view may have a pyramid shape with a focal point of the pyramid being the lens or lenses of the lens systems of the camera arrangement.

Different scenes of objects at different distances within the camera arrangement field of view may have quadrilateral shapes. As a distance from the camera is increased in a composite camera arrangement field of view, scenes corresponding with cross-sections of the pyramid composite camera arrangement field of view at the increasing distances may have quadrilateral shapes with increasing areas. A controller may determine a level of diffusion for illumination of a composite camera arrangement field of view based on a level of inclusion of a telephoto field of view or a wide angle field of view in the composite field of view. The level of inclusion may vary in a spectrum from the composite camera arrangement field of view being primarily based on the wide-angle field of view to the composite camera arrangement field of view being based primarily on the telephoto field of view. In some embodiments, a controller may be configured to receive information indicating a camera optical zoom level, a camera mode, such as a wide-angle mode or a telephoto mode, a digital zoom level, an estimated distance to objects in a scene to be captured by the camera, or other camera information, such as auto-focus information. The information may correspond to a level of inclusion of a wide angle field of view or a telephoto field of view in a composite camera arrangement field of view that varies. The controller may further be configured to infer the level of inclusion of the wide-angle field of view or the telephoto field of view in the composite camera field of view based on the optical or digital zoom level of the camera, the distance to the scene, and/or the camera mode. The level of diffusion may be selected to diffuse light such that the illumination field of view is focused to correspond with the composite camera arrangement field of view.

In some embodiments, the illumination field of view may illuminate objects in a scene in the composite camera arrangement field of view at a particular distance such that corner portions of the scene, which comprises a quadrilateral cross section passing through the composite camera arrangement field of view at the particular distance, are illuminated to a substantially similar degree as a center portion of the quadrilateral scene.

For a given image capture operation, a level of diffusion may be selected and the controller may be configured to cause the adjustable light diffusing material to adjust to the selected level of diffusion and cause the one or more illumination elements to emit light that passes through the adjustable light diffusing material adjusted to the selected level of diffusion.

In some embodiments, the controller may further be configured to determine an illumination intensity for the one or more illumination elements and cause the one or more illumination elements to emit light according to the determined illumination intensity. In some embodiments, an illumination intensity for the one or more illumination elements may be determined based, at least in part, on a distance from a light source module to objects in a scene in a camera field of view to be illuminated. Also, in some embodiments, an illumination intensity for one or more illumination elements may further be determined based, at least in part, on ambient lighting conditions for a scene to be illuminated or an amount of diffusion to be applied by an adjustable light diffusing material.

Some embodiments provide a light source module that includes one or more illumination elements configured to emit light and an adjustable light diffusing material positioned relative to the one or more illumination elements such that light emitted from the one or more illumination elements is diffused by the adjustable light diffusing material as the light passes through the adjustable light diffusing material. For example, the one or more illumination elements may be LEDs and the adjustable light diffusing material may be positioned adjacent to the LEDs such that light emitted from the LEDs passes through the adjustable light diffusing material when exiting the light source module. The light source module further includes a controller configured to select a level of diffusion for the adjustable light diffusing material for illumination of a composite field of view of a camera arrangement based, at least in part, on a level of inclusion of a wide-angle lens system field of view or a telephoto lens system field of view in a composite camera arrangement field of view, wherein the determined level of diffusion is determined such that light emitted from the light source module substantially fills the composite camera arrangement field of view. The controller is further configured to cause the adjustable light diffusing material to adjust to the determined level of diffusion and cause the one or more illumination elements to emit light that passes through the adjustable light diffusing material adjusted to the determined level of diffusion.

Some embodiments provide a method, which can be performed by one or more computer systems, which includes determining or receiving a combination of fields of view from two or more lens systems of a camera arrangement for inclusion in a field of view of an image being captured by the camera arrangement. The method further includes determining, based on the combination of fields of view, a level of diffusion to apply to light emitted from one or more illumination elements of a light source module via an adjustable light diffusing material, wherein the determined level of diffusion is selected to diffuse light emitted from the one or more illumination elements such that the light substantially fills a scene in the camera arrangement field of view. Furthermore the method includes illuminating the quadrilateral scene via the light source module according to the determined level of diffusion.

Figure 1A:
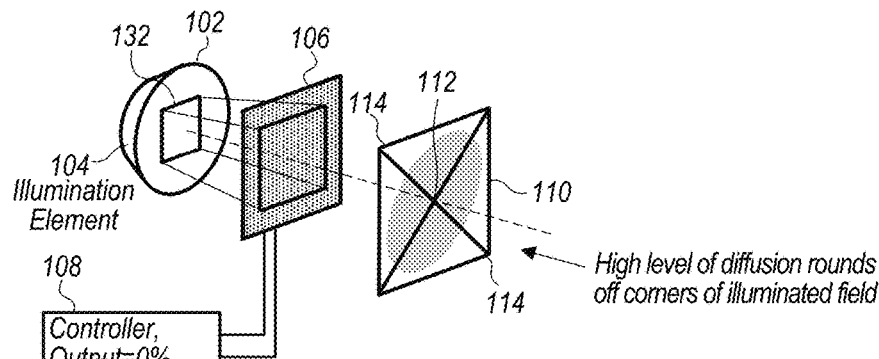
FIGS. 1A-C illustrate a light source module with an adjustable light diffusing material illuminating scenes at different distances, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments provide a light source module with an adjustable light diffusing material positioned relative to one or more illumination elements such that light emitted from the one or more illumination elements is diffused by the adjustable light diffusing material as the light passes through the adjustable light diffusing material. The light source module may emit a pyramid shaped beam of light with square or rectangular cross-sections and may be configured to project a light pattern that corresponds to a pyramid shaped composite field of view of one or more cameras associated with the light source module. The composite camera field of view may have rectangular or square shaped cross sections at different distances (e.g. scenes) within the composite camera field of view. The composite field of view may be a combination of a wide-angle field of view of a wide-angle lens system and a telephoto field of view of a telephoto lens system. Also, the composite field of view may continuously vary over a spectrum from nearly fully wide-angle to nearly fully telephoto based on a level of inclusion of the wide-angle field of view or the telephoto field of view in the composite camera field of view. For example, in some embodiments, a first camera may include a telephoto lens system and a second camera may include a wide-angle lens system, in such embodiments the first and second camera may capture composite images that use some image data from each of the two cameras. In such embodiments a composite field of view of the two cameras may vary based on a level of inclusion of image data from each of the two cameras in a composite image. In other embodiments, a common camera may include an aperture associated with a telephoto lens system and an aperture associated with a wide-angle lens system and may combine light or image data from both the wide-angle lens system and the telephoto lens system to form a composite image. A level of inclusion of light or image data from the wide-angle lens system or the telephoto lens system may be adjustable such that a level of inclusion of a telephoto field of view or a wide-angle field of view in a composite camera field of view may be adjusted.

Furthermore, the light source module may include or interact with a controller that is configured to adjust a level of diffusion of the adjustable light diffusing material for light emitted from the light source module based, at least in part, on a level of inclusion of a wide-angle lens system field of view or a telephoto lens system field of view in a composite camera field of view.

In some embodiments, a light source module may include or interact with a controller configured to determine an estimated distance to a camera field of view and adjust a level of diffusion of the adjustable light diffusing material based on the distance to the camera field of view such that light emitted from the light source module substantially illuminates the one or more objects in the scene within the camera field of view. For example, when an estimated distance to one or more objects in a scene in a camera field of view is a shorter distance, a controller may adjust an adjustable light diffusing material to diffuse light to a higher degree so that light is evenly spread across the closer scene in the camera field of view. The controller may also adjust the adjustable light diffusing material to diffuse light to a lesser degree when an estimated distance to an object in a scene in a camera field of view is a greater distance away. For example, at greater distances light emitted from a light source module may diverge as the light travels the greater distance so that less diffusion is needed to evenly distribute the light. Also, less diffusion of light may allow more light to be directed at an object in a scene in a camera field of view that is further away. In some embodiments, a controller may adjust a light diffusing material to diffuse light to different degrees when capturing images of one or more objects in a camera field of view at a same distance from the camera when a balance between inclusion of a wide-angle lens field of view and a telephoto lens field of view in a camera field of view is adjusted. For example at a given distance, a controller may cause light to be diffused to a greater degree when predominantly using a wide-angle lens system than when predominantly using a telephoto lens system.

Some embodiments may include a controller that estimates a distance to an object in a scene in a field of view of a camera based on information received from the camera. For example, a controller may use, zoom level information and/or autofocus information from a camera to estimate a distance to one or more objects in a scene to be captured by the camera. In some embodiments, a controller for a light source module may be included with a controller that also controls a camera associated with the light source module. In some embodiments, a controller for a light source module may be separate from a camera controller and may receive information from a camera controller, such as zoom information and/or autofocus information.

In some embodiments, a controller for a light source module may also determine an illumination intensity for illumination elements of a light source module. For example, a controller for a light source module may use an estimated distance to an object in a scene to be captured by the camera, camera sensor sensitivity settings, such as camera ISO settings or shutter speeds, ambient lighting conditions, and/or a selected level of diffusion for an adjustable light diffusing material to determine an illumination intensity for one or more illumination elements of a light source module. For example, under darker light conditions, a camera may select a certain ISO setting that corresponds with darker conditions and a controller may select illumination settings for illumination elements of a light source module that correspond to a higher illumination intensity to illuminate the darker field of view. The selected illumination settings may be greater than would be selected for a field of view with brighter lighting conditions. In some embodiments, a controller for a light source module may independently determine a level of diffusion for an adjustable light diffusing material. The controller may also independently determine illumination intensity settings for illumination elements of the light source module based on the distance to the object in the scene in the camera field of view, light conditions of the scene in the camera field of view, and/or the determined level of diffusion determined for the adjustable light diffusing material. In some embodiments, a controller may further adjust a level of diffusion selected for a field of view based on a determined illumination intensity for illuminating the field of view.

In some embodiments, an adjustable light diffusing material may include a polymer stabilized cholesteric texture (PSCT). A PSCT may include liquid crystals in a cholesteric phase that are arranged in a polymer substrate in a disorganized manner when no electrical field is applied to the adjustable light diffusing material. When an electrical field is not being applied to the PSCT material, the cholesteric liquid crystals may diffuse light passing through the adjustable light diffusing material or may block a portion of light from passing through the adjustable light diffusing material. For example, an adjustable light diffusing material comprising PSCT may appear opaque when electrical voltage is not being applied to the adjustable light diffusing material. However, when alternating current electrical power is applied to the adjustable light diffusing material a resulting electrical field may cause the cholesteric liquid crystals to be oriented in the electrical field in such a way that light can pass between the cholesteric liquid crystals and reduce an amount of diffusion of the light passing through the PSCT material. Furthermore, as discussed in more detail below, the cholesteric liquid crystals may be ordered in the electrical field such that the cholesteric liquid crystal molecules torsionally rotate such that adjacent layers of the cholesteric liquid crystal are aligned further allowing light to pass through the cholesteric liquid crystal and polymer composite and further reducing an amount of diffusion of light passing through the PSCT material.

In some embodiments, other liquid crystal materials may be used in an adjustable light diffusing material. For example, liquid crystals is a smectic phase or liquid crystals in a polymer network liquid crystal (PNLC) may be used in some embodiments. In a smectic phase, liquid crystals may be organized in layers and may vary in orientation based on a strength of an electrical field applied to the smectic phase liquid crystals. Thus a level of diffusion of light passing through an adjustable light diffusing material comprising smectic phase liquid crystals may be adjusted by adjusting voltage, current, or frequency of electrical power being applied to the adjustable light diffusing material comprising the smectic phase liquid crystals to generate an electrical field in the adjustable light diffusing material. In a similar manner, liquid crystals in a polymer network liquid crystal (PNLC) may have an orientation of the liquid crystals in the PNLC adjusted in a way that adjusts a level of diffusion of light passing through the PNLC. The adjustment of the orientation of the liquid crystals in the PNLC may be proportional to a voltage, current, or frequency of electrical power being applied to an adjustable light diffusing material comprising the PNLC material. In some embodiments, other suitable materials may be used in an adjustable light diffusing material. For example, other types or phases of liquid crystals may be used in some embodiments.

In some embodiments, an adjustable light diffusing material of a light source module may, in addition to diffusing light emitted from the light source module, obscure a view of internal components of the light source module. For example, an adjustable light diffusing material may be opaque when a voltage is not being applied to the adjustable light diffusing material. The opaque adjustable light diffusing material may obscure internal components of the light source module from a user and may give the light source module a more sleek appearance that blends the light source module into the appearance of a mobile computing device in which the light source module is embedded.

Light Source Module with Adjustable Light Diffusing Material

In some embodiments, a light source module may include an adjustable light diffusing material that enables the light source module to illuminate rectangular or square scenes in a camera field of view at varying distances. For example, FIG. 1A illustrates light source module 102 that may be embedded in a mobile device along with a camera. Light source module 102 includes illumination element 104 and adjustable light diffusing material 106. For clarity of illustration adjustable light diffusing material 106 is shown in an exploded view as being separate from light source module 102. However, in some embodiments, an adjustable light diffusing material, such as adjustable light diffusing material 106, may be coupled to a light source module as part of a lens or cover for the light source module. Also, in some embodiments, an adjustable light diffusing material may be included in a housing that positions the adjustable light diffusing material adjacent to a light source module such that light emitted from illumination elements of the light source module pass through the adjustable light diffusing material and is diffused by the adjustable light diffusing material.

In FIG. 1A, controller 108 has a first controller output, for example a controller output of 0%. A controller, such as controller 108, may control an electrical voltage, current, or frequency of electrical power that is applied to an adjustable light diffusing material, such as adjustable light diffusing material 106. Applying electrical power to an adjustable light diffusing material, such as adjustable light diffusing material 106, may cause an electrical field to be generated in relation to the adjustable light diffusing material. The electrical field may cause liquid crystals, such as in a polymer stabilized cholesteric texture (PSCT), to orient in a way such that more light is able to pass through the adjustable light diffusing material or such that light passing through the adjustable light diffusing material is diffused to a lesser degree. When, electrical power is not being applied to an adjustable light diffusing material, such as in FIG. 1A, for example wherein controller 108 is at zero output, the adjustable light diffusing material may be opaque and diffuse light passing through the adjustable light diffusing material to a high level of diffusion. In some embodiments, a level of diffusion of an adjustable light diffusing material may be proportional to a voltage, current, or frequency of electrical power applied to the adjustable light diffusing material. Thus, a continuous range of diffusion levels may be achieved by adjusting the voltage, current, or frequency of electrical power applied to the adjustable light diffusing material.

Maintaining an adjustable light diffusing material in an opaque state when not in use may be desirable to users of a mobile device because it may give the mobile device a more sleek appearance and hide internal components of a light source module. For example, a light source module for a camera of a mobile computing device may appear hidden to a user except for when the light source module is being used to capture images. For example, adjustable light diffusing material 106 is opaque when not in use. It should also be noted that other liquid crystal technologies require electrical power to be applied to maintain an opaque state of an adjustable light diffusing material and are translucent when electrical power is not being applied to the other liquid crystal technologies. Such technologies may consume significant amounts of battery power of a mobile device to maintain an adjustable light diffusing material in an opaque state when a light source module is not being used. However, adjustable light diffusing materials, such as adjustable light diffusing material 106, may work in an opposite manner such that electrical power is not required to maintain the adjustable light diffusing material in an opaque state.

In addition, illuminating objects in a quadrilateral scene in a camera field of view of one or more cameras associated with a light source module evenly across the quadrilateral scene may result in better images being captured by the associated one or more cameras than if the quadrilateral scene was illuminated unevenly. For example in FIGS. 1A-1C light source module 102 has a rectangular (quadrilateral) output pattern 132. A rectangular output pattern of a light source module may be designed to match a rectangular (quadrilateral) scene in a camera field of view of an associated one or more cameras. Thus, the light source module may be configured to project light in a pyramid shaped pattern matching the one or more camera's field of view with rectangular cross-sections at various distances from the one or more cameras. However, at varying width camera fields of view different levels of diffusion of light may be required to evenly illuminate a camera field of view while maintaining a rectangular illumination pattern of a scene at a given distance within the camera field of view.

For example, as can be seen in FIG. 1A, if an adjustable light diffusing material applies a high level of diffusion to light emitted from a light source module, the adjustable light diffusing material may cause corner portions of a scene in a camera field of view to be illuminated to a lesser degree than a center portion of the scene in the camera field of view. This may be caused by the adjustable light diffusing material blocking a portion of the light emitted from an illumination element of a light source module, such as illumination element 104 of light source module 102. For example, scene 110 is illuminated in center portion 112, but corner portions 114 are illuminated to a lesser degree than center portion 112.

In contrast, if an adjustable light diffusing material applies too little diffusion, concentrated light may illuminate a center portion of a scene in a camera field of view but may not be spread out into corner portions of the scene in the camera field of view. Also, as distances between a light source module and objects in a scene in a camera field of view to be illuminated by the light source module are increased, light emitted from a light source module may diverge and spread out across a larger area as the light travels from the light source module to the objects in the scene in the camera field of view. Thus at greater distances, less diffusion may be needed to evenly illuminate a rectangular scene in a camera field of view than is needed at shorter distances. Also, a light source module that applies a high level of diffusion when illuminating a scene in a camera field of view at a greater distance may cause light emitted from the light source module to be scattered such that only a small portion of the light emitted from the light source module arrives at objects in the scene in the camera field of view at the greater distance.

In some embodiments, a controller, such as controller 108, may use a level of inclusion of a wide-angle field of view of a wide angle lens system and a level of inclusion of a telephoto field of view of a telephoto lens system in a composite camera field of view to determine a level of diffusion for illuminating a scene in the composite camera field of view.

Figure 1B:
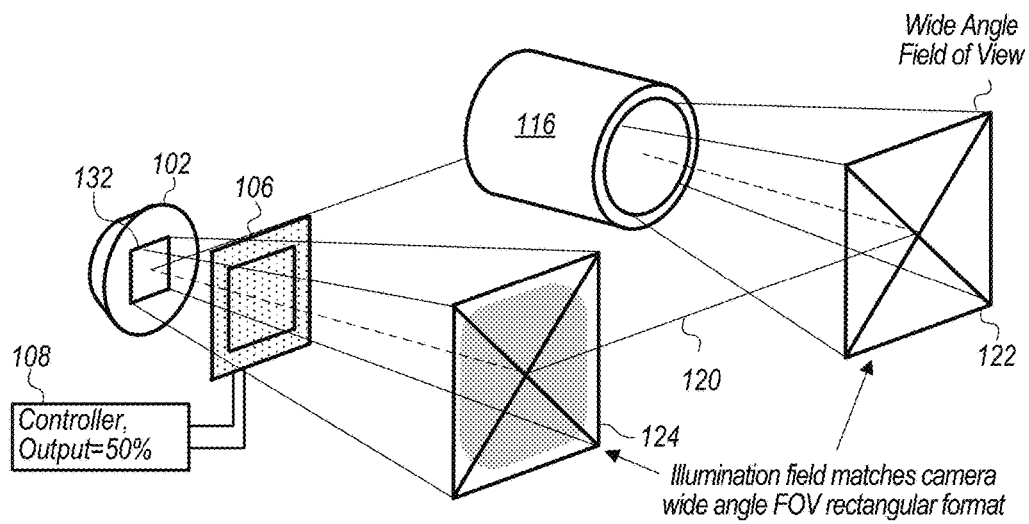
Figure 1C:
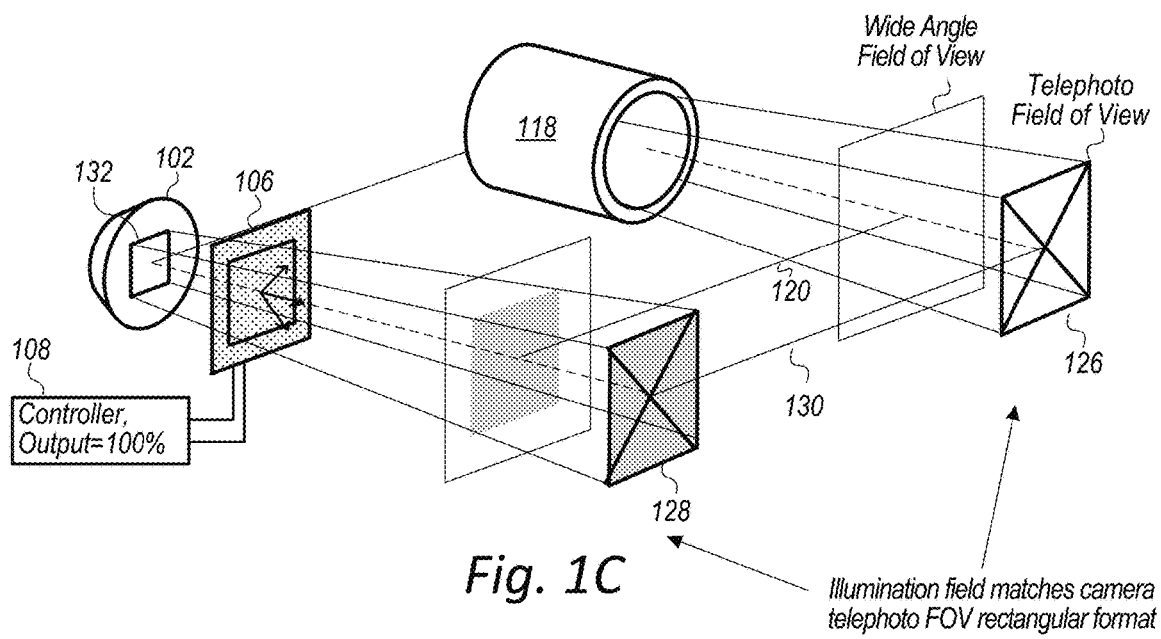
Figure 1D:
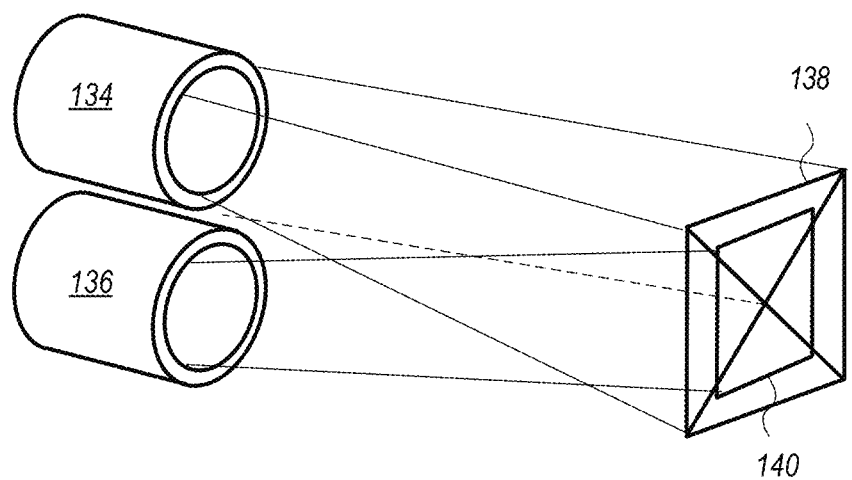
FIG. 1D illustrates a composite camera field of view, according to some embodiments.

FIG. 1D illustrates an example composite field of view that includes a combination of a telephoto field of view and a wide-angle field of view, according to some embodiments. Camera 134 may include a wide-angle lens system and camera 136 may include a telephoto lens system. In some embodiments, cameras 134 and 136 may be arranged such that the fields of view of the cameras overlap one another. For example, wide angle field of view 138 from camera 134 overlaps with telephoto field of view 140 from camera 136. Also, in some embodiments, cameras 134 and 136 may be arranged such that at least a portion of one of the fields of view of the respective cameras does not overlap with the other camera fields of view. For example, at least a portion of wide angle field of view 138 from camera 134 does not overlap with telephoto field of view 140 from camera 136. In some embodiments, a composite field of view may include both the wide angle field of view and the telephoto field of view. In some embodiments, a camera arrangement may include other lens systems or additional lens systems. For example, in some embodiments, one or more intermediate lens systems between a full telephoto lens system and a full wide-angle lens system may be included. In regard to a particular image capture operation or ongoing image capture operation a controller for a mobile device that includes cameras 134 and 136 may select a level of inclusion for image data from the wide angle field of view 138 and the telephoto field of view 140 in an image to be captured by cameras 134 and 136. As described above, a light source controller may determine a level of diffusion based on the level of inclusion of the telephoto field of view or the wide angle field of view in the composite field of view of the one or more cameras, such as cameras 134 and 136.

In some embodiments, a level of inclusion of a wide-angle field of view or a level of inclusion of a telephoto field of view may be inferred from camera zoom level information and/or distance information. In some embodiments, a camera may determine an estimated distance to an object in a camera field of view and a controller for a light source module may use the estimated distance determined by the camera to adjust a level of diffusion for illumination of a scene. In some embodiments, a controller may receive camera information from a camera, such as auto-focus information, and may determine an estimated distance to an object in a scene in a camera field of view based on the received camera information. In some embodiments, a controller may determine an estimated distance to a scene to be captured by a camera based on whether the camera is operating in a telephoto mode or a wide angle mode. Also, in some embodiments, a mobile device may include multiple cameras, such that when operating in a telephoto mode a telephoto camera is selected and when operating in a wide angle mode, a wide angle camera is selected. In some embodiments a single camera may include two apertures and two lens systems, wherein one of the lens systems has a wider angle than the other lens system, such as a telephoto lens system. Also, in some embodiments, a mobile device may operate in a hybrid mode that utilizes both a telephoto camera and a wide angle camera at the same time. A controller may use any of the above described combinations of wide angle, telephoto, and/or varying degrees of wide-angle/telephoto composite field of view selections to adjust a level of diffusion of an adjustable light diffusing material.

For example, in FIG. 1B, camera 116 is primarily in a wide angle camera selection and controller 108 adjusts controller 108 output to a second output level, for example 50%, based on the level of inclusion of the wide-angle field of view and/or an estimated distance 120 to scene 122 in a composite field of view. Adjusting controller 108 to the second output level causes diffusion of light emitted from illumination elements 104 to be less than diffusion of light at the first output level as shown in FIG. 1A. The adjusted diffusion level of adjustable light diffusing material 106 may cause light to evenly illuminate scene 124 in an illumination field of the light source module, wherein scene 124 has a quadrilateral shape matching scene 122 in the composite field of view. For clarity, scene 122 in the composite field of view and scene 124 in the illumination field are shown in FIG. 1B as adjacent to each other. However, in operation, scene 124 in the illumination field and scene 122 in the composite field of view may be on top of each other, e.g. camera 116 may be taking a picture of the same scene that is being illuminated by light source module 102.

Continuing the example, in FIG. 1C camera 118 is primarily in a telephoto camera selection and controller 108 adjusts controller 108 to a third output level, for example to 100%. This results in adjustable light diffusing material 106 being in a translucent state that minimally diffuses light emitted from illumination element 104. The reduced amount of diffusion causes light emitted from light source module 102 to be more focused and thus reach scene 128 in the illumination field that is at a further distance 130. However, because the light emitted from light source module 102 travels a further distance 130 to scene 128 than light emitted from light source module 102 traveled to scene 124 at distance 120, the light spreads out to a greater degree as the light travels the further distance 130 and evenly illuminates scene 128. As discussed above, scene 128 in the illumination field and scene 126 in the composite field of view are illustrated as being adjacent to one another in FIG. 1C. However in operation scene 128 and scene 126 may be on top of each other or represent the same scene.

As can be seen in FIGS. 1A-1C adjusting a level of diffusion of an adjustable light diffusing material may enable a single light source module to emit light that substantially fills quadrilateral scenes in a field of view of one or more cameras at varying distances and with varying width camera fields of view. Whereas, a constant level diffuser may under diffuse light at close distances and over diffuse light at further away distances. Also, an adjustable light diffusing material allows a single illumination element to be used to illuminate both primarily wide-angle composite fields of view and primarily telephoto composite fields of view. This is as opposed to including multiple illumination elements and multiple light diffusing materials having different light diffusing properties for different respective camera modes, such as a wide-angle mode or a telephoto mode. By consolidating to a single illumination element or set of illumination elements, a light source module capable of evenly illuminating both far away and close in scenes may occupy less space in a mobile computing device than other designs. Also a single light source module may illuminate composite camera fields of view of various sizes that vary between primarily wide-angle and primarily telephoto.

In addition, an adjustable light diffusing material may enable light emitted from a light source module to be focused for different width composite camera fields of view at a same distance from the camera. For example, a camera may be configured to allow a user to select between a wide-angle camera mode and a telephoto camera mode. The user may select between the different camera modes when capturing images of objects at a particular distance from the camera. Also, in some embodiments, a user may select one or more optical zoom levels from a plurality of optical zoom levels supported by one or more cameras when capturing images of objects a particular distance from the one or more cameras, wherein the optical zoom levels range from wide-angle to telephoto.

Figure 2A:
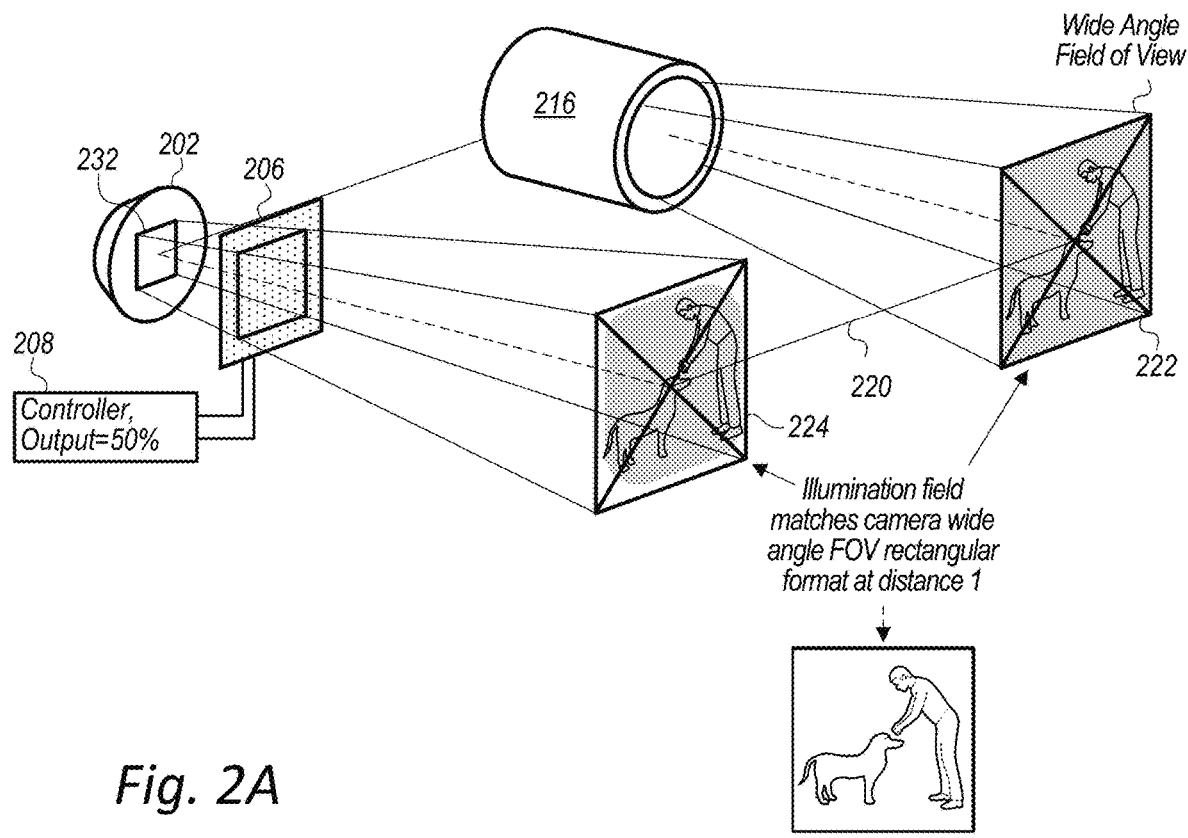
FIGS. 2A-B illustrate a light source module with an adjustable light diffusing material illuminating scenes at a same distance in different camera modes, according to some embodiments.
Figure 2B:
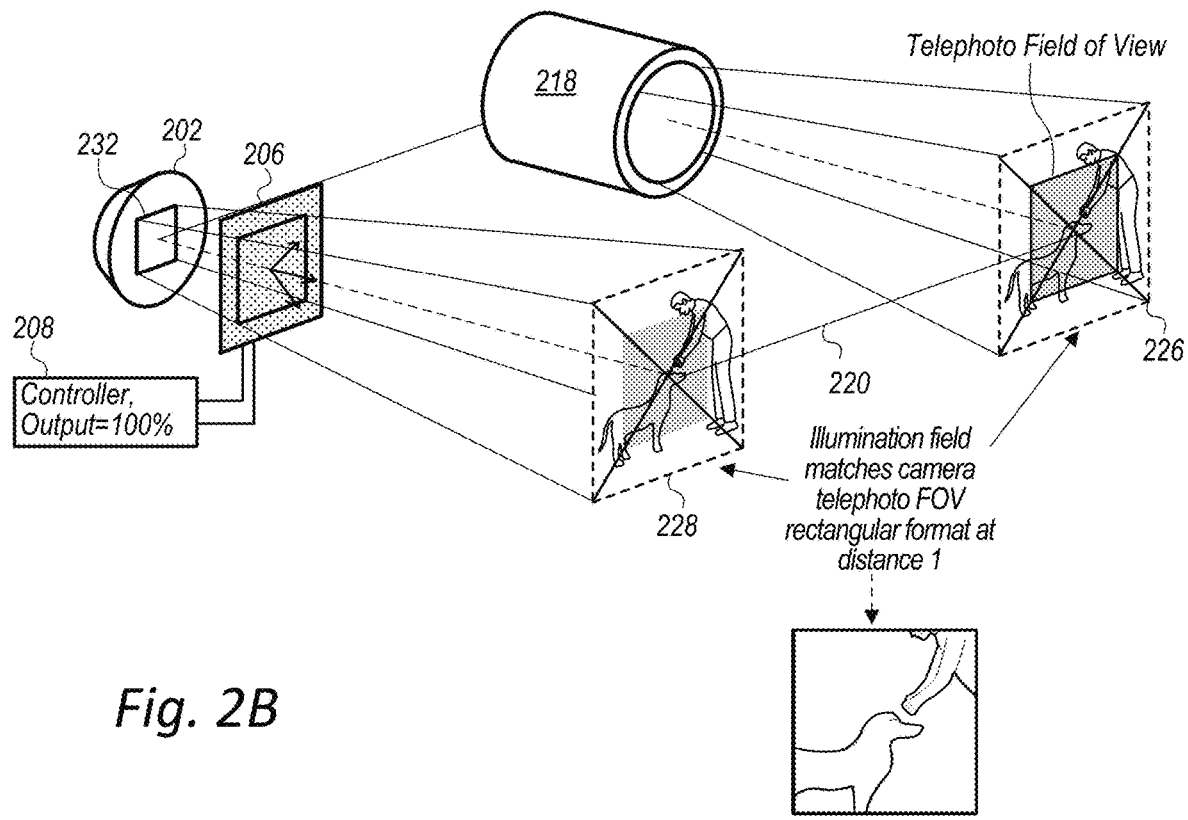

For example, FIGS. 2A-B illustrate a light source module with an adjustable light diffusing material illuminating scenes at a same distance in different camera modes or at different zoom levels, according to some embodiments.

Light source module 202 includes a rectangular (quadrilateral) output pattern 232 and an adjustable light diffusing material 206. Controller 208 adjusts an electrical voltage, current, or frequency of electrical power applied to light diffusing material 206 to adjust a degree of diffusion of light passing through light diffusing material 206. Note that any of the light source modules described in FIGS. 1A-C may further be adjusted as described in FIGS. 2A-2B.

In FIG. 2A camera 216 is in a primarily wide-angle field of view selection and is capturing a wide-angle image of scene 222 in a composite camera field of view. Controller 208 adjusts a level of diffusion of adjustable light diffusing material 206 to evenly illuminate scene 224 in an illumination field such that light emitted from the light source module substantially fills the scene. As discussed above, scene 222 in the composite camera field of view and scene 224 in the illumination field of view are illustrated as being adjacent to one another for clarity. However, in operation, scene 222 may be the same scene as scene 224 such that light source module 202 illuminates scene 222 in the composite camera field of view of camera 216. Note that in FIG. 2A, scene 222 in the primarily wide angle camera field of view is at distance 220 from camera 216 and light source module 202.

FIG. 2B illustrates a camera capturing an image of a scene at the same distance, e.g. distance 220, but with a different composite camera field of view than in FIG. 2A. Camera 218 in FIG. 2B is adjusted to a primarily telephoto field of view selection, as opposed to camera 216 in FIG. 2A that is adjusted to a primarily wide-angle field of view. Camera 218 may focus on a smaller area or scene as compared to the scene 222 in the primarily wide-angle field of view illustrated in FIG. 2A at a same distance 220 from the camera. Accordingly, when capturing a photo with a camera adjusted to have a primarily telephoto composite field of view, a smaller area may be required to be illuminated when in the primarily telephoto field of view adjustment than when the camera is adjusted in a primarily wide-angle field of view adjustment for a scene at a same distance from the camera.

As can be seen in FIG. 2B, the output of controller 208 is increased to second output level, e.g. to 100%, to cause light diffusing material 206 to be more translucent and diffuse light to a lesser degree than as shown in FIG. 2A, wherein controller 208 is adjusted to a first output level, e.g. 50% output. This may result in a more focused light pattern being emitted from light source module 202 that illuminates scene 228 in an illumination field of view that matches the primarily telephoto field of view of camera 218. Thus in some embodiments, a controller of a light source module may focus light based on a level of inclusion of a telephoto field of view or a level of inclusion of a wide-angle field of view in a composite camera field of view when capturing images at a particular distance from the camera in addition to or in place of adjusting a level of diffusion based on an estimated distance to a field of view of a camera. Also, in some embodiments, a controller of a light source module may focus light based on a selected optical or digital zoom level for capturing images at a particular distance from the camera in addition to or in place of adjusting a level of diffusion based on an estimated distance to a field of view of a camera.

Figure 3:
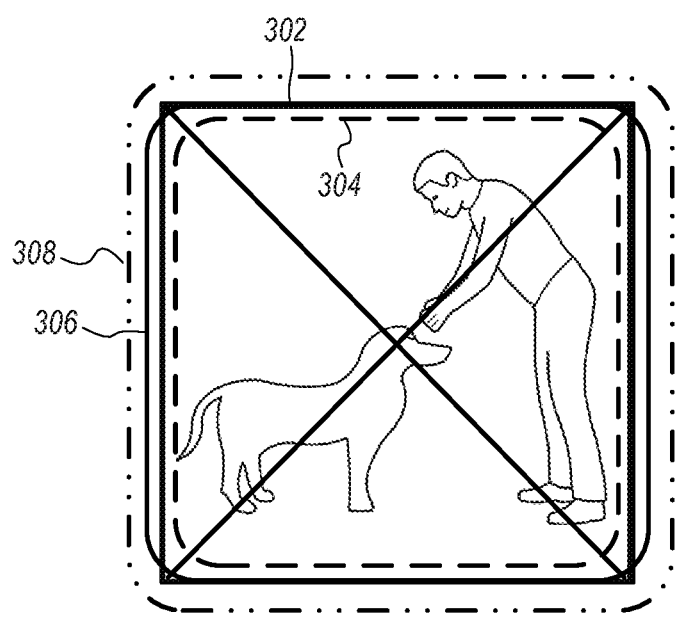
FIG. 3 illustrates a scene within a camera field of view and different examples of light emitted from a light source module that substantially fill the scene in the camera field of view, according to some embodiments.

FIG. 3 illustrates a scene within a composite camera field of view and different examples of light emitted from a light source module that substantially fill the scene in the composite camera field of view, according to some embodiments.

In some embodiments, as an amount of diffusion applied to light emitted from an illumination element of a light source module is increased a degree to which corners of a scene illuminated by the light source module may increase.

In some embodiments, a controller may select a level of diffusion to be applied to light emitted from a light source module such that an illumination field is maintained within a composite camera field of view. For example, FIG. 3 illustrates illumination field 304 within composite camera field of view 302. Controlling a level of diffusion such that the illumination field is maintained within the composite camera field of view without exceeding the camera field of view or with minimal amounts of the illumination field of view exceeding the camera field of view may reduce an amount of power used to illuminate a composite camera field of view as compared to other control schemes because less power may be required to cause the adjustable light diffusing material to adjust the level of diffusion. In some embodiments, some uneven illumination in corners of a scene within a camera field of view may be tolerable while still substantially filling the scene. For example, in FIG. 3 some of the corners of composite camera field of view 302 fall outside of illumination field 304.

In some embodiments, a controller may select a level of diffusion to be applied to light emitted from a light source module such that a composite camera field of view is maintained within an illumination field of view. For example, FIG. 3 illustrates composite camera field of view 304 maintained within illumination field of view 308. Controlling a level of diffusion such that a composite camera field of view is maintained within the illumination field of view may require more power than controlling a level of diffusion such that the illumination field of view is maintained within the composite camera field of view. This is because additional power may be applied to an adjustable light diffusing material to cause the adjustable light diffusing material to diffuse the light into a larger illumination field. Also, a greater illumination intensity from light emitted from illumination elements of a light diffusing material may be required to illuminate an illumination field such that the composite camera field of view is maintained within the illumination field. However, in such embodiments, corner portions of the camera field of view may be illuminated to a substantially similar degree as a center portion of the composite camera field of view because the illumination field extends beyond the corners of the composite camera field of view.

In some embodiments, a controller may select a level of diffusion to be applied to light emitted from a light source module such that an illumination field of view partially extends beyond a composite camera field of view without maintaining the full composite camera field of view within the illumination field of view. For example, illumination field 306 extends beyond composite camera field of view 302 on two sides but does not fully include composite camera field of view 302 within illumination field 306. Such an approach may consume less power than illumination field 308 but more power than illumination field 304. Also, such an approach may include some rounded corners of composite camera field of view 302 within illumination field 306, but the degree to which rounded corners are included in composite camera field of view 302 may be less than in illumination field 304.

In some embodiments, a controller may operate according to one of the control schemes described above or may vary control schemes based on a level of diffusion being selected. For example, in some embodiments, at lower diffusion levels (e.g. higher controller output voltages) a controller may select a level of diffusion such that an illumination field is maintained within a composite camera field of view such as illumination field 304. At intermediate levels of diffusion the controller may change control schemes such that an illumination field at least partially extends beyond the composite camera field of view such as illumination field 306. At higher levels of diffusion, the controller may change control schemes such that a composite camera field of view is maintained within the illumination field such as illumination field 308.

In some embodiments, a controller may alternatively or additionally take into account a distance to an object in a scene in the camera field of view when determining a size for an illumination field. For example a controller may control an illumination field such that the composite camera field of view is maintained within the illumination field when capturing an image in a wide-angle mode of an object at a close distance to the camera. In such a situation corners of the composite camera field of view not being fully illuminated may have a greater impact on the image to be captured than if the object was far away from the camera or the camera was operating in a primarily telephoto composite field of view. Conversely, a controller may control an illumination field such that the illumination field is maintained within a composite camera field of view when capturing an image in a primarily telephoto mode of an object at a further away distance from the camera. In such a situation, illumination of corners of the composite camera field of view may have less impact on the quality of an image captured of a scene that includes objects at the farther away distance from the camera than if the camera was taking a wide-angle image of a closer object.

Example Mobile Devices Including an Adjustable Light Source Module

Figure 4A:
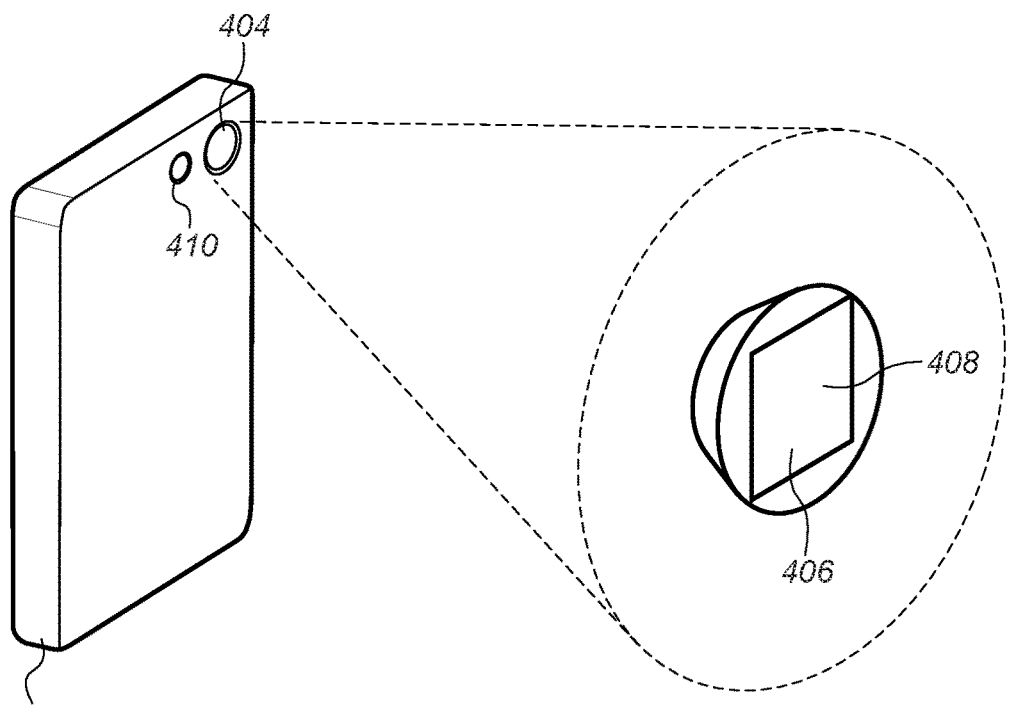
FIGS. 4A-B illustrate a light source module with an adjustable light diffusing material embedded in a mobile computing device, according to some embodiments.
Figure 4B:
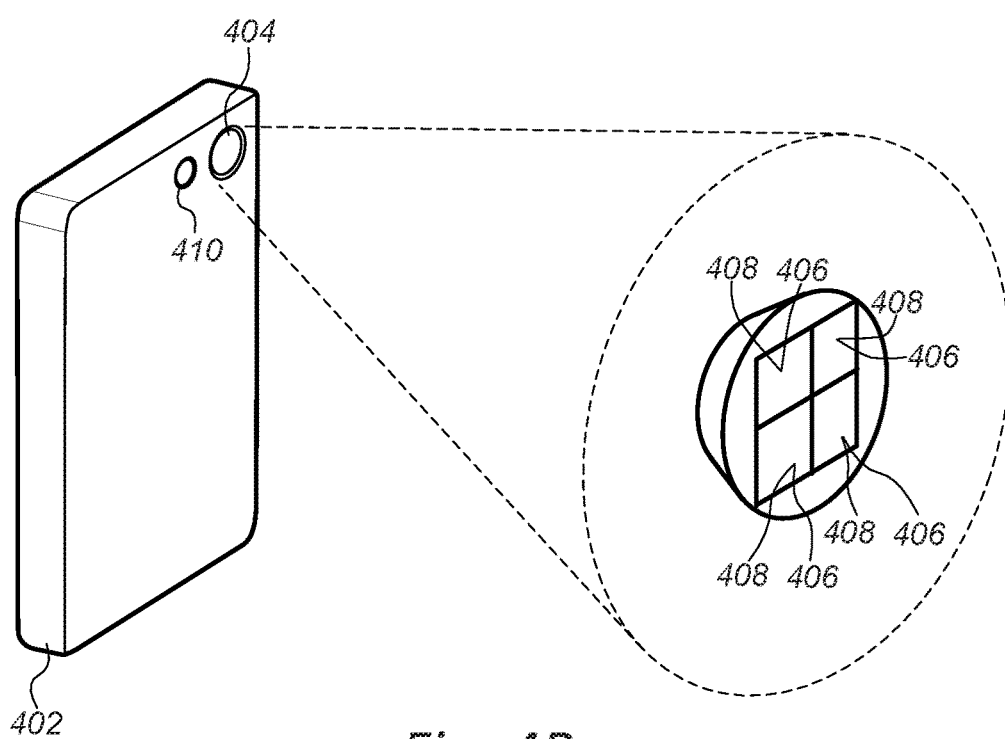

FIGS. 4A-B illustrates mobile device 402 that includes light source module 3404 and camera 410. Camera 410 may include a first aperture associated with a wide angle lens system and a second aperture associated with a telephoto lens system or may include more than one camera, wherein at least one of the cameras has an aperture associated with a wide-angle lens system and at least one of the cameras has an aperture associated with a telephoto lens system. For example camera 410 may include wide-angle camera 116, telephoto camera 118, both wide-angle camera 116 and telephoto camera 118, or a hybrid camera that is configured to operate in both a wide-angle and telephoto mode. In some embodiments, a scene in a camera field of view may be adjusted based on a digital zoom. In some embodiments, a camera field of view may alternatively or additionally be adjusted using an optical zoom. In some embodiments, an adjustable light diffusing material of a light source module may be configured to adjust a level of diffusion to substantially fill scenes in camera fields of view varying from a lowest combination optical and digital zoom level to a highest combination optical and digital zoom level. In some embodiments, a camera may allow a digital zoom level to be zoomed in past a corresponding illumination field adjustment. For example, a digital zoom may allow a camera field of view to zoom in on an object in a smaller scene in a camera field of view than the smallest illumination field adjustment the light source module supports by adjusting an adjustable light diffusing material. In such situations an adjustable light diffusing material may be adjusted to a minimal diffusion level (e.g. high control output voltage). In such embodiments, an adjustable light diffusing material may adjust an illumination intensity based on the digital zoom level while adjusted to the minimal diffusion level.

In some embodiments that include more than one camera, the highest and lowest diffusion levels may correspond to the highest and lowest optical zoom levels of the different cameras. In embodiments with two or more cameras, the highest diffusion level (e.g. a low controller output voltage) may correspond to the field of view for the wide-angle camera (or shortest focal length in situations of three or more cameras). Also, the lowest diffusion level (e.g. a high controller output voltage) may correspond to a field of view for the telephoto camera (or the longest focal length camera in situations of three or more cameras). In some embodiments, if one or more of the cameras is a zoom camera, the high and low diffusion values may correspond to the lowest and highest optical zoom levels achievable by any of the cameras. In some embodiments, the highest diffusion level could correspond to digital zoom levels beyond the highest optical zoom levels achievable by the cameras.

In some embodiments, a controller may control a light source module in a wide illumination field, for example illumination field 308, when a zoom level is within an optical zoom level of one or more cameras of a mobile device. The controller may then control a light source module in a telephoto illumination field, for example illumination field 304, when a zoom level is at a digital zoom level that exceeds an optical zoom level of one or more camera included in a mobile computing device.

In some embodiments, a controller may control a light source module to illuminate a scene with varying illumination fields, such as illumination fields 304, 306, and 308 with transitions at varying zoom levels between a minimal optical zoom level and a maximum digital zoom level that exceeds a maximum optical zoom level. In some embodiments, a controller may control a light source module to illuminate a scene with varying illumination fields, such as illumination fields 304, 306, and 308 where transitions between the different illumination field control schemes is continuous. For example, a controller may control an illumination field to fit within a camera field of view such as illumination field of view 304 and continuously expand the illumination field based on increased zoom levels through various intermediate illumination fields between illumination field 304 and 306 and between illumination field 306 and 308.

In some embodiments, a light source module embedded in a mobile computing device, such as light source module 404 embedded in mobile device 402 may include segments wherein each segment includes an illumination element that is independently controllable independent of other illumination elements that correspond with other segments of the light source module. In addition, each segment may have a separate illumination pattern 408 and a separate adjustable light diffusing material 406. In some embodiments a segmented light source module may share a common adjustable light diffusing material, such as light diffusing material 406 that spans across multiple ones of the segments of the light source module. In some embodiments, in order to illumination a particular one or more portions of a scene in a composite camera field of view to a different degree than one or more other portions of the scene a combination of one or more segments may be adjusted to different levels of diffusion or different illumination intensities. In some embodiments some segments may be illuminated while capturing an image while other segments are not illuminated. In some embodiments, different segments may have different lighting properties and a combination of segments may combine to emit light having desired lighting properties. For example, in some embodiments different segments may include illumination elements that emit light having different color temperatures. In such embodiments, a level of diffusion, light intensity, and a combination of segments to be illuminated may be adjusted to emit light from a light source module having desired lighting properties, for example a desired composite color temperature. In some embodiments, various other lighting properties may be achieved by adjusting each segment independently and by selecting which segments to illuminate where different segments have different lighting properties.

Light source module 404 may be the same as light source module 102 described in FIGS. 1A-1C and 2A-2B and may be controlled by a controller, such as controller 108. Light source module 404 includes a rectangular illumination pattern 408 and an adjustable light diffusing material 306. Adjustable light diffusing material 406 may include a polymer stabilized cholesteric texture (PSCT) and function in a similar manner as adjustable light diffusing material 106 described in FIGS. 1A-1C and 2A-2B.

Example Uses of a Mobile Device Including an Adjustable Light Source Module

FIGS. 5A-F illustrate a mobile computing device with an adjustable illumination element and an adjustable light diffusing material capturing images at different distances, under different lighting conditions, and at different zoom levels, according to some embodiments.

In some embodiments, a light source module, such as light source module 102 illustrated in FIGS. 1A-1C or light source module 202 illustrated in FIGS. 2A-2B may also be configured to adjust an intensity of light emitted from an illumination element, such as illumination element 104. For example, in order to illuminate a dark scene, an illumination element may emit more light or more intense light than when the illumination element is illuminating a brighter scene. In some embodiments, a controller, such as controller 108, may receive lighting information from a camera or a light sensor and adjust an illumination intensity according to lighting conditions in a field of view of a camera associated with a light source module. For example, a camera may provide image sensitivity settings, camera ISO settings, shutter speed settings, etc. to a controller, such as controller 108, and the controller may determine an illumination intensity to be applied to illumination elements to illuminate a scene based on the received lighting condition information. In some embodiments, a controller may further be configured to adjust a diffusion setting for capturing an image based on lighting conditions in addition to a distance to a scene in a composite field of view of a camera associated with the light source module an a zoom level selected for capturing an image of the scene in the field of view of the camera.

Figure 5A:
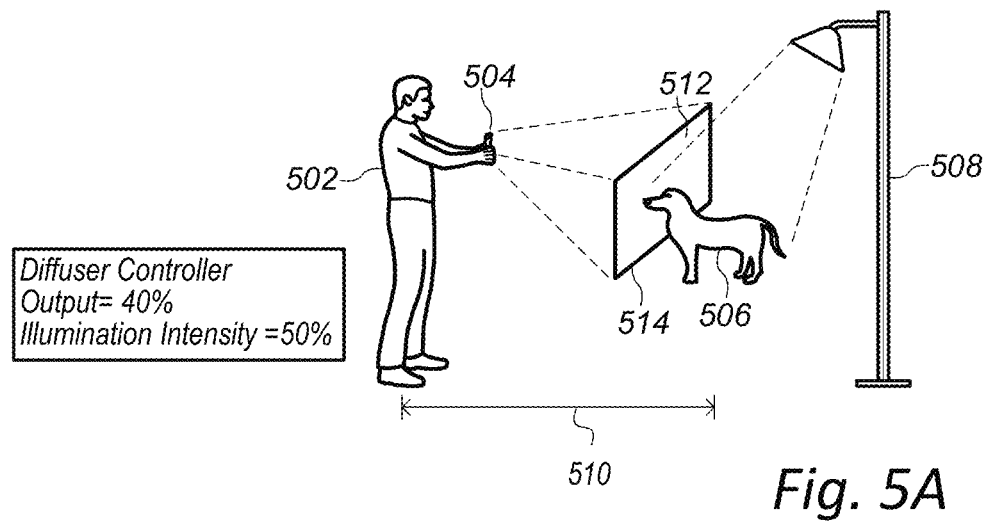
FIGS. 5A-F illustrate a mobile computing device with an adjustable illumination element and an adjustable light diffusing material capturing images at different distances, under different lighting conditions, and at different zoom levels, according to some embodiments.
Figure 5B:
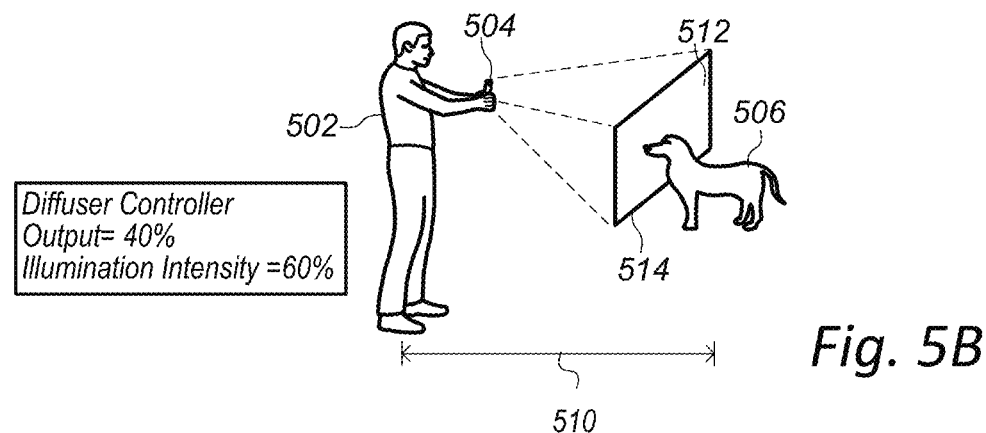

For example, in FIGS. 5A and 5B a user 502 is using mobile computing device 504 to capture an image of scene 512 that includes a dog 506. In FIG. 5A lamp 508 illuminates the scene 512 that includes the dog 506. A camera included in mobile computing device 504 may determine a distance 510 to dog 506. For example, an autofocus feature of the camera included in mobile computing device 504 may determine dog 506 is distance 510 away from mobile computing device 504. In addition, a camera in mobile computing device 504 may be automatically or manually adjusted to appropriate sensitivity settings for a scene with lighting conditions such as scene 512 in FIG. 5A that is illuminated by lamp 508. In some embodiments, a camera included in mobile computing device 504 may determine lighting condition information for scene 512 and distance information for scene 512 and provide the determined lighting condition, distance information, and a selected zoom level and/or level of inclusion of a telephoto field of view or a wide-angle field of view in a composite field of view to a controller for a light source module included in mobile computing device 504. In other embodiments, a camera included in a mobile computing device, such as mobile computing device 504, may provide camera information to a light source module controller, such as a zoom level, autofocus information, and camera ISO setting information, and the controller for the light source module may determine lighting condition information and distance information.

Based on determined lighting condition information, zoom level, or distance information, a controller associated with a light source module may determine illumination intensity settings for illumination elements of the light source module. The controller may also determine a diffusion level for illumination of a scene, such as scene 512. The diffusion level may be determined such that an illumination pattern, such as illumination pattern 514, which has a quadrilateral shape, substantially matches a quadrilateral shape of a scene in the field of view of a camera of the mobile computing device, such as scene 512. Furthermore, the diffusion level may be selected such that a center portion of the illumination pattern, for example illumination pattern 514, is illuminated to a substantially similar degree as corner portions of the illumination pattern 514.

In FIG. 5A for a shorter distance 510 and brighter lighting conditions due to lamp 508, a lower output (higher level of diffusion) and medium illumination intensity are selected. In FIG. 5B dog 506 is the same distance 510 from user 502, however scene 512 is not illuminated by lamp 508. The same diffusion level is selected for illuminating scene 512 in FIG. 5B, however a greater illumination intensity is selected due to less light being cast on the scene because lamp 508 is not present.

Figure 5C:
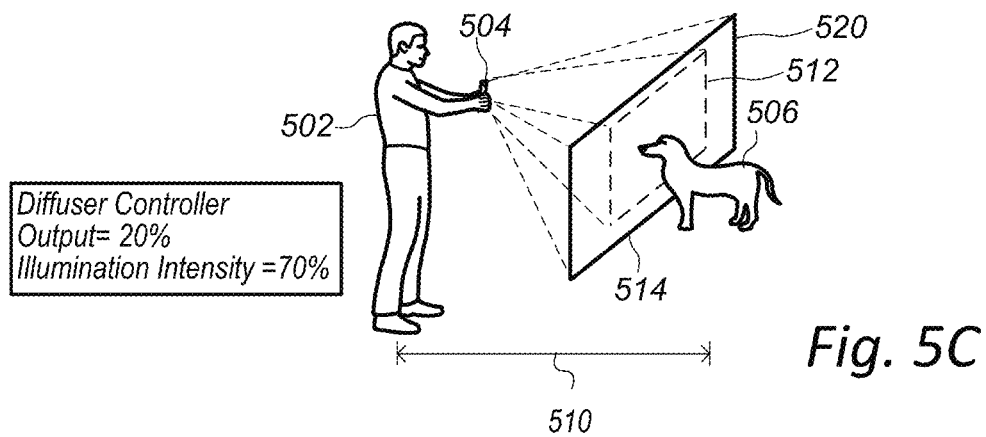

In FIG. 5C dog 506 is at a same distance 510 as is illustrated in FIG. 5B and lighting conditions in FIG. 5C are similar to the lighting conditions in FIG. 5B. However, in FIG. 5C a composite camera field of view a camera of mobile computing device 504 has been adjusted to zoom out such that scene 520 in FIG. 5C is a larger quadrilateral than scene 512 in FIG. 5B. This is due to the camera in mobile computing device 504 having a composite field of view that primarily combines a wide-angle field of view of a wide-angle lens system into the composite field of view. In such a situation a lower diffuser controller output may be selected (higher level of diffusion) and a greater illumination intensity than was selected in FIG. 5B. For example, in order for illumination pattern 514 to substantially fill scene 520 light emitted from a light source module of mobile computing device 504 is spread across a wider angle illumination field requiring a higher amount of diffusion. Also, because at the higher level of diffusion (lower diffuser controller output) an adjustable light diffusing material of the light source module is more opaque, a higher illumination intensity may be applied to sufficiently illuminate scene 520 under the given lighting conditions at the distance 510.

Figure 5D:
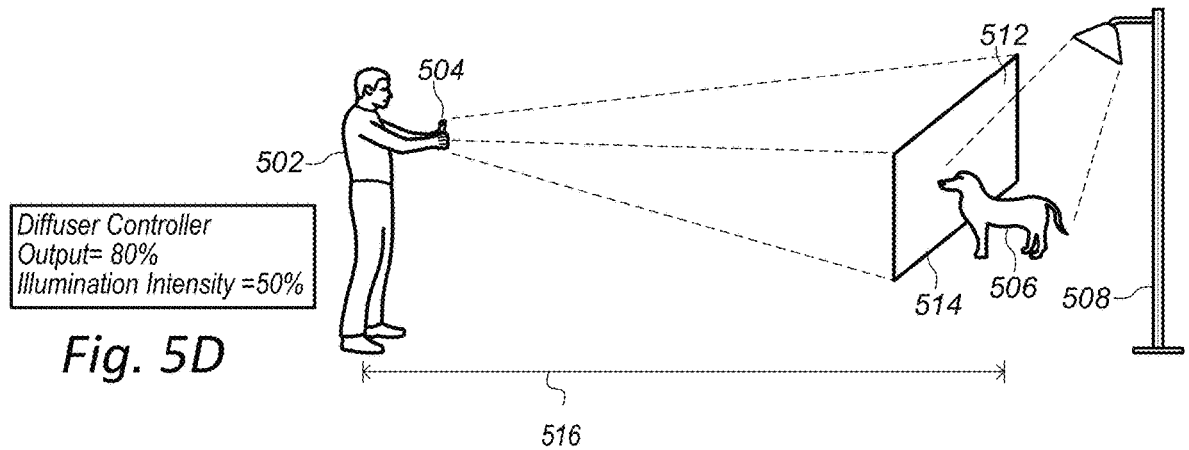

In FIG. 5D, dog 506 is a greater distance 516 from user 502. Due to the greater distance, less diffusion is needed to evenly illuminate scene 512. For example, light emitted from a light source module included in mobile computing device 504 diverges as the light travels the greater distance 516. Therefore, the controller that controls the adjustable light diffusing material has a higher output (greater power results in less diffusion) than the controller did in FIGS. 5A and 5B. The controller also adjusts for lighting conditions in a similar manner as described in FIGS. 5A, 5B and 5C. For example, in FIG. 5E more lighting is needed to illuminate scene 512 than in FIG. 5D because lamp 508 does not provide light to scene 512 in FIG. 5E.

Figure 5E:
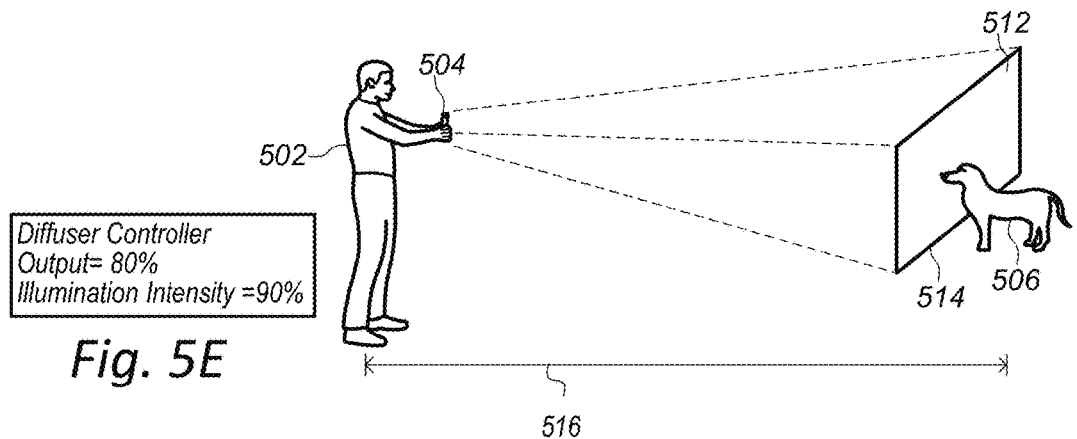
Figure 5F:
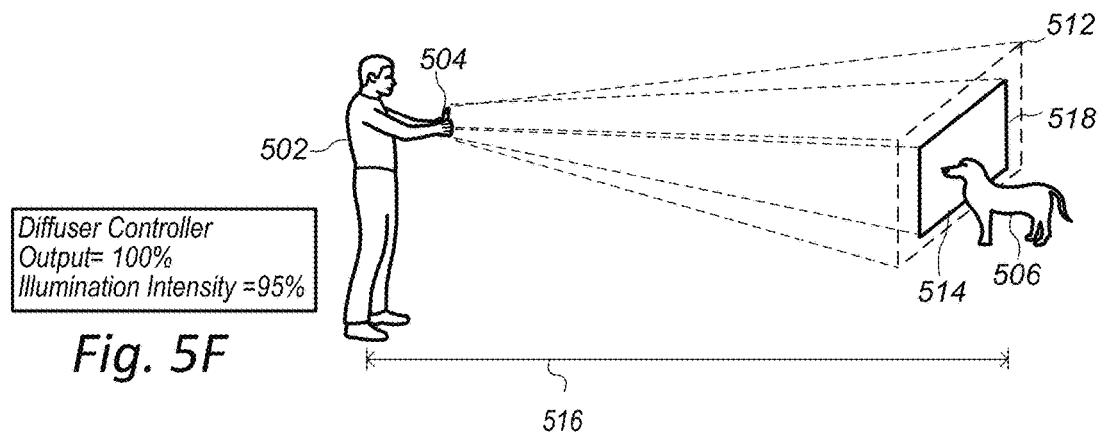

In FIG. 5F dog 506 is at a same distance 516 from user 502 as is the user in FIG. 5E and is under similar lighting conditions as in FIG. 5E. However, in FIG. 5F a composite camera field of view of a camera in mobile computing device 504 has been adjusted to further zoom in on dog 506. For example, scene 518 at the higher zoom level has a smaller quadrilateral shape than scene 512. This may be because a composite field of view of a camera included in the mobile computing device 504 is primarily combining a telephoto lens system field of view into the composite field of view. Also, illumination pattern 514 is smaller such that illumination pattern 514 substantially fills scene 518. In some embodiments, a camera may support both optical and digital zoom. For example, a diffuser controller may be configured to diffuse light a maximum amount (lowest diffuser output level) when the camera is adjusted to a lowest optical zoom level (primarily wide-angle field of view) and diffuse light a minimal amount or not at all when the camera is adjusted to a highest optical zoom level (primarily telephoto field of view). However, in some embodiments, a digital zoom may allow a camera to be zoomed in past a maximum optical zoom level. In such situations, an illumination intensity of an illumination element may be increased above an illumination intensity that was used at the maximum optical zoom level. For example, FIG. 5F illustrates a diffuser controller at full output (minimum or no light diffusion). Also, in FIG. 5F an illumination intensity is adjusted to a higher illumination intensity than in FIG. 5E.

Note that numerical values are given in FIGS. 1A-C, 2A-2B, and 5A-5F for diffusion controller output settings and illumination intensity settings as examples. In some embodiments, any number of combinations of diffusion settings and illumination intensity settings may be used depending on a determined distance to a scene to be illuminated, based on a selected camera mode, and/or based on lighting conditions of the scene to be illuminated.

Example Lens and Reflectors

In some embodiments, a light source module may include a total internal reflective (TIR) lens and/or a reflector. A TIR lens may be configured to reflect light such that the light is directed in a particular direction. For example, as opposed to a non-TIR light source that generates light that leaves the light source spread across 360 degrees or 180 degrees, a TIR lens may concentrate the light into a concentrated beam in a particular direction. In some embodiments, a TIR lens may be included in a light source module between an illumination element and an adjustable light diffusing material. The adjustable light diffusing material may diffuse the concentrated light exiting the TIR lens. However, for illuminating scenes at far distances an adjustable light diffusing material may apply minimal diffusion and the concentrated beam of light from the TIR lens may travel to the farther away scene and illuminate the farther away scene to a greater degree than non-concentrated light from a light source that does not include a TIR lens. Thus, a light source module with both a TIR lens and an adjustable light diffusing material may be configured to provide diffuse light to illuminate close-up to mid-range scenes and may provide a concentrated light beam to reach far away scenes.

Figure 6A:
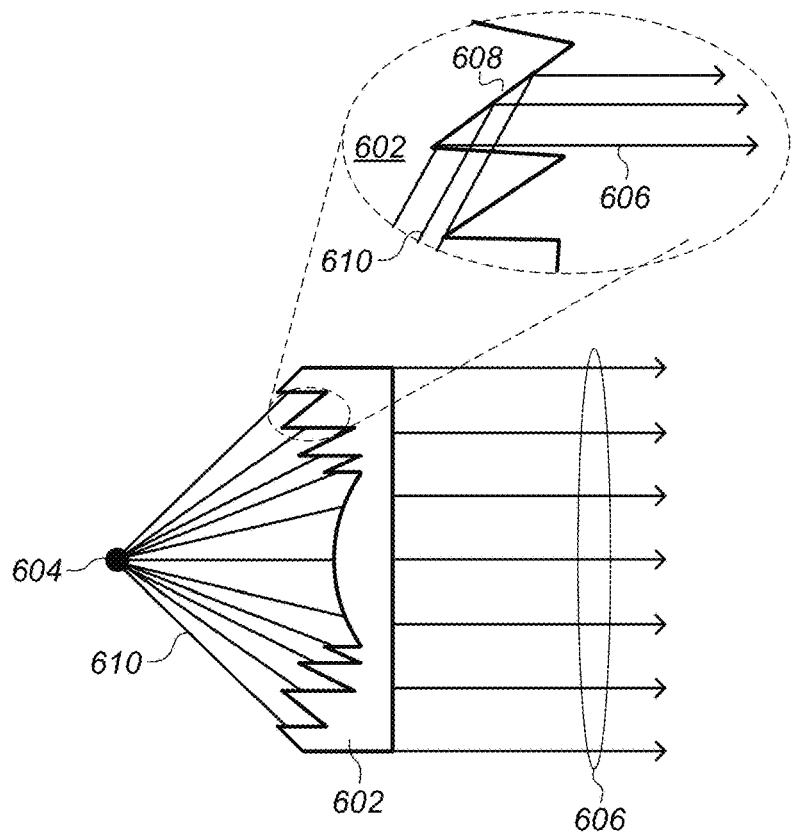
FIG. 6A illustrates a total internal reflection (TIR) lens that may be included in a light source module, according to some embodiments.

FIG. 6A illustrates an example TIR lens. Lens 602 receives light from illumination element 604 and provides a concentrated light beam 606. As can be seen in the cut-out diagram, lens 602 includes grooves 608 that are angled such that light 610 from illumination element 604 pass through a portion of lens 602 and are reflected off of grooves 608 such that the reflected light is parallel to other light reflected off of other portions of grooves 608. Thus, whereas light 610 from illumination element 604 was originally directed in multiple directions, light 606 exiting lens 602 is concentrated and generally directed in the same direction.

Figure 6B:
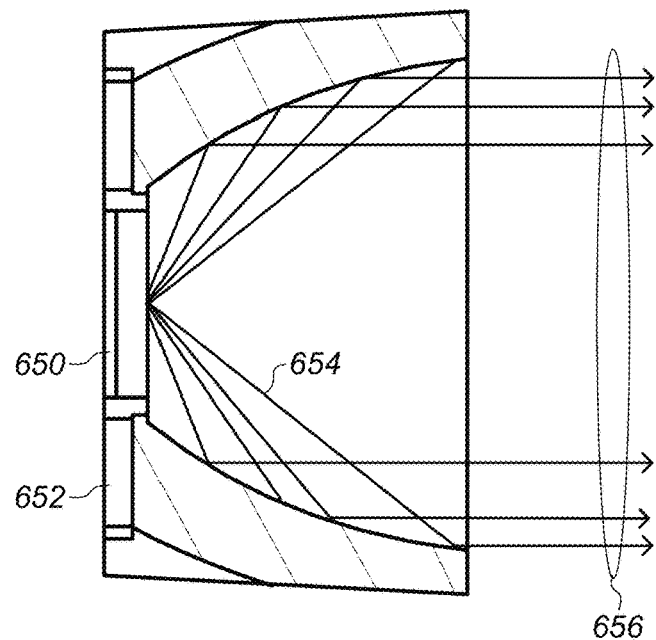
FIG. 6B illustrates a reflector that may be included in a light source module, according to some embodiments.

FIG. 6B illustrates an example reflector. The reflector includes a reflector body 652 that has a curved shape that is designed such that light 654 from illumination element 650 is reflected off of the reflector body such that the reflected light is parallel to other light reflected off of the reflector body. This results in a concentrated light beam 656 leaving reflector body 652.

In some embodiments, a light source module may include both a TIR lens and a reflector, such as the reflector described in FIG. 6B. Furthermore, an adjustable light diffusing material may be placed in a position adjacent to a TIR lens such that light leaving the TIR lens passes through the adjustable light diffusing material before exiting the light source module.

Figure 7A:
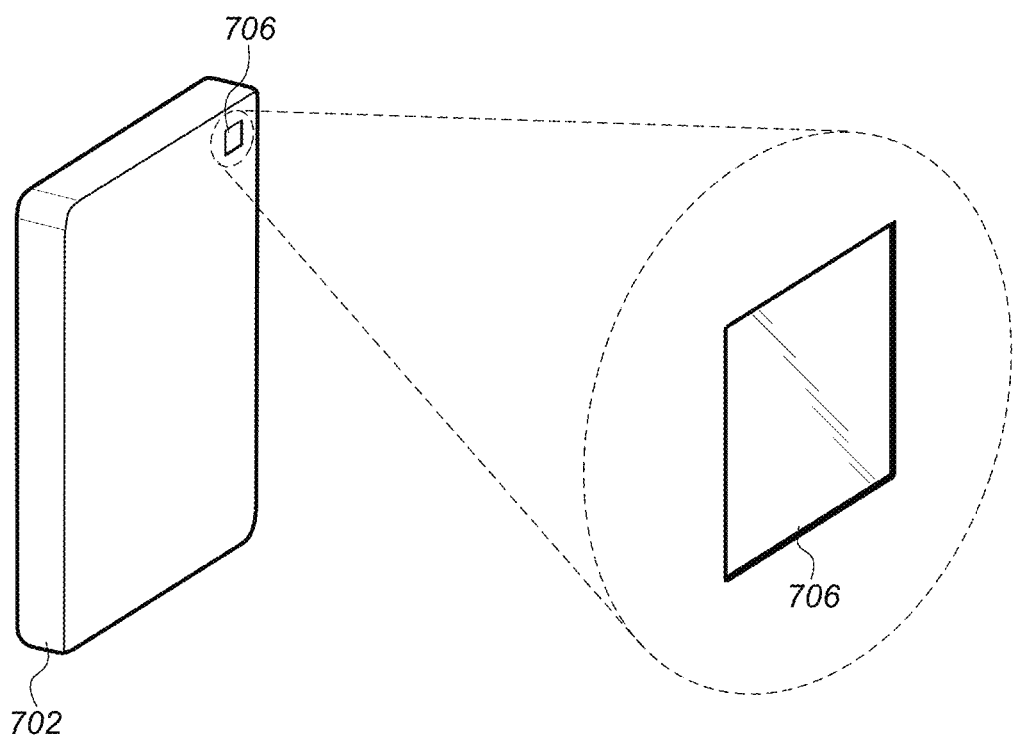
FIG. 7A-B illustrate a light source module with an adjustable light diffusing material in an opaque state and a clear state, according to some embodiments.
Figure 7B:
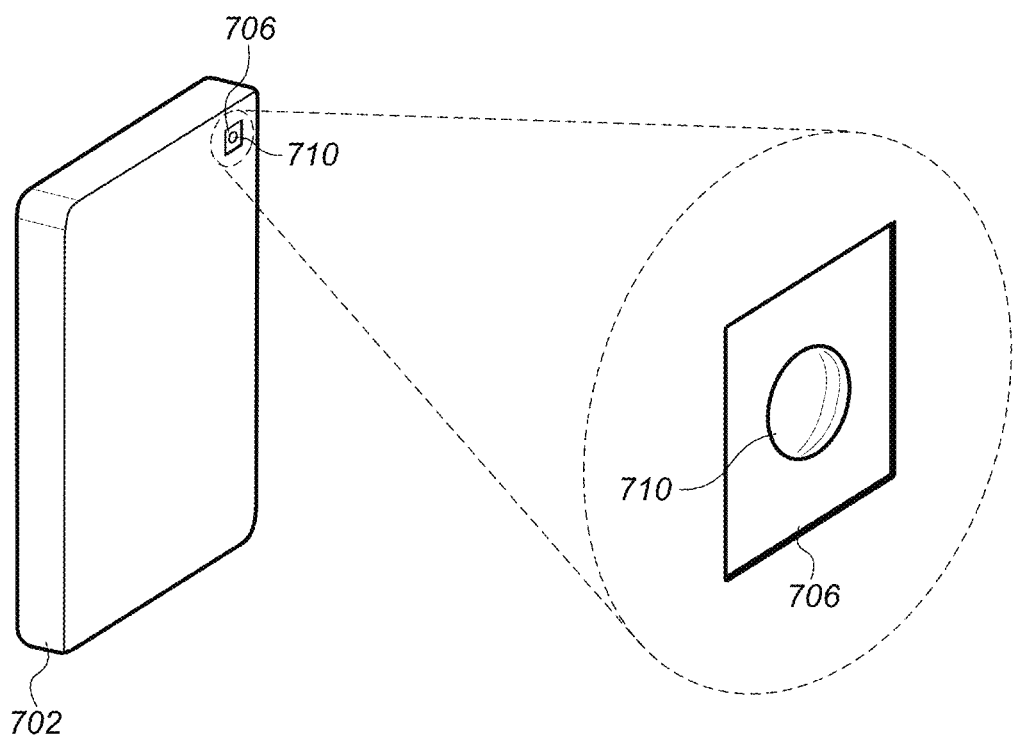

Concealment of Light Source Module Internals Via Adjustable Light Diffusing Material As discussed above, an adjustable light diffusing material including a polymer stabilized cholesteric texture (PSCT) may be opaque when electrical power is not being applied to the adjustable light diffusing material and may be translucent when electrical power is applied to the adjustable light diffusing material. In the opaque state internal components of a light source module, such as illumination elements may be hidden from a user behind the opaque adjustable light diffusing material. For example, FIG. 7A shows mobile computing device 702 with light source module 706 in the opaque state. Also, FIG. 7B shows light source module 706 when electrical power is being applied to the adjustable light diffusing material to adjust a diffusion level of the adjustable light diffusing material. As can be seen in FIG. 7B, in the non-opaque state internals of the light source module, such as illumination element 710 may be visible.

Example Adjustable Light Diffusing Materials

In some embodiments, an adjustable light diffusing material, such any of the adjustable light diffusing material described above in FIGS. 1-7, may include a polymer stabilized cholesteric texture (PSCT). A PSCT may include liquid crystals and a low concentration of polymer, for example 10% polymer or less. As opposed, to some other liquid crystal polymer materials, a PSCT material may be opaque in a non-energized state and may diffuse light less and become more transparent as an electrical field is applied to the PSCT material. Also, a PSCT material may be configured to change a diffusion characteristic of the PSCT material depending on an amount of alternating current power that is applied to the PSCT material or based on a frequency of the alternating current power that is applied to the PSCT material. For example, a diffusion characteristic of a PSCT material may be adjusted by adjusting a voltage, current, or frequency of power applied to the PSCT material to generate an electrical field in relation to the PSCT material.

Figure 8A:
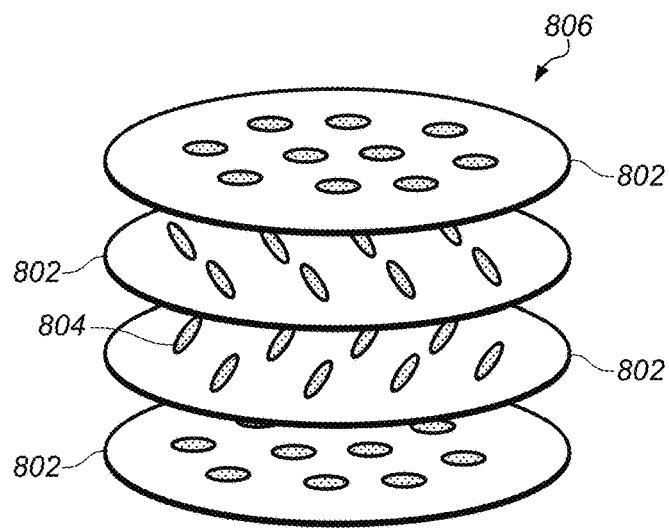
FIG. 8A illustrates a cholesteric liquid crystal that may be included in a polymer stabilized cholesteric texture (PSCT) that makes up part of an adjustable light diffusing material, according to some embodiments.

A PSCT material may include liquid crystal molecules in a cholesteric phase. In a cholesteric phase, sheets of parallel liquid crystal molecules are rotated relative to adjacent sheets of liquid crystals to form a helical structure. For example, FIG. 8A illustrates sheets 802 of liquid crystal molecules 804, where each sheet of liquid crystal molecules is rotated relative to a neighboring sheet. The cholesteric liquid crystals illustrated in FIG. 8B as cholesteric liquid crystals 808 may include cholesteric liquid crystals such as cholesteric liquid crystals 806 illustrated in FIG. 8A.

Figure 8B:
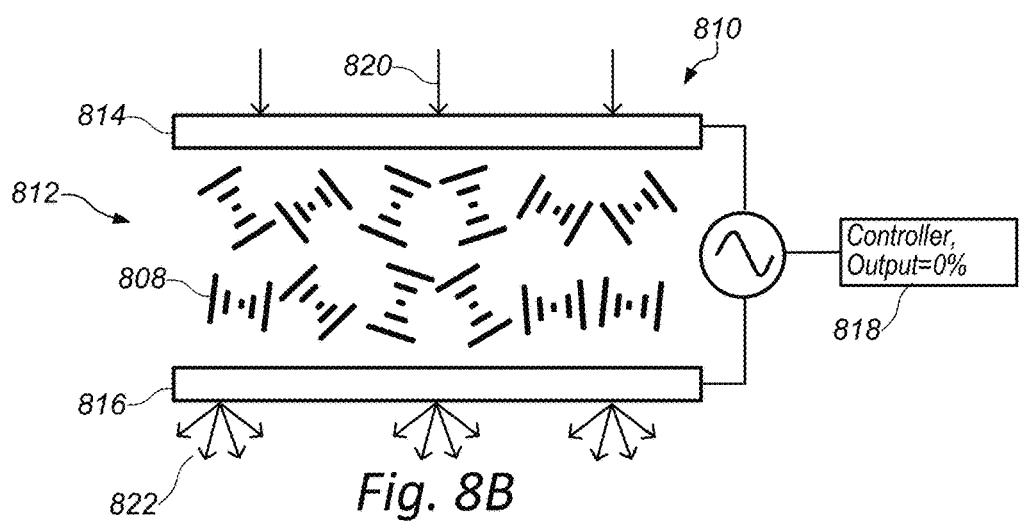
FIG. 8B-C illustrate a polymer stabilized cholesteric texture (PSCT) adjustable light diffusing material with light diffusing properties that are adjustable based on applying a current or voltage, according to some embodiments.
Figure 8C:
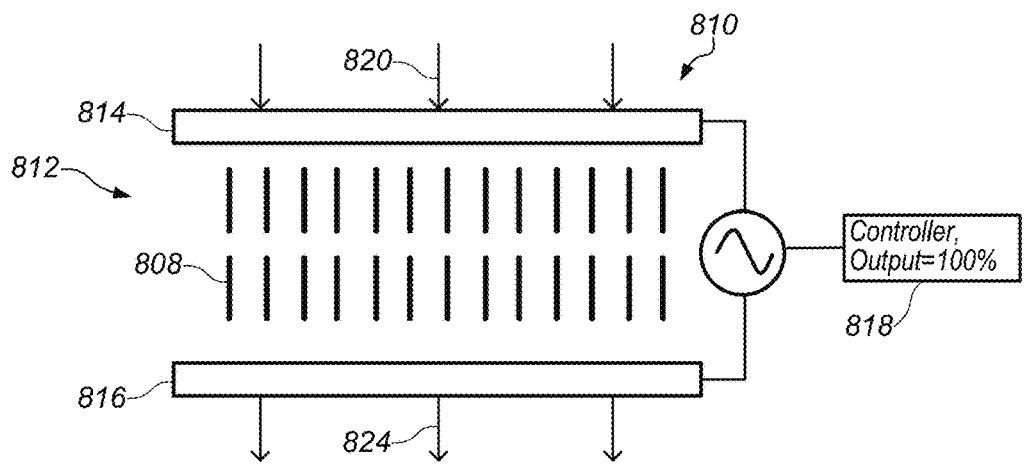

FIG. 8B and FIG. 8C illustrate an adjustable light diffusing material that includes a PSCT material, according to some embodiments. Adjustable light diffusing material 810 includes PSCT material 812 that includes cholesteric liquid crystals 808. Adjustable light diffusing material 810 also includes transparent electrodes 814 and 816. For simplicity of illustration, adjustable light diffusing material 810 is illustrated in an energized state (FIG. 8C) and a non-energized state (FIG. 8B). However, in some embodiments, various states between fully energized and non-energized may be achieved by varying a voltage, current, or frequency of electrical power applied to the adjustable light diffusing material. In FIG. 8B, controller 818 is set to not provide electrical power to transparent electrodes 814 and 816. In the non-energized state, cholesteric liquid crystals 808 are non-uniformly arranged and oriented in PSCT material 812. As light 820 passes through the PSCT material 812, the light bounces off of cholesteric liquid crystals 808 and is diffused. As can be seen, light 822 exits adjustable light diffusing material 810 directed in multiple directions.

In contrast, in FIG. 8C electrical power is applied to transparent electrodes 814 and 816. This causes an electrical field to be generated across PSCT material 812. The electrical field causes the cholesteric liquid crystals 808 to align in an organized manner that allows light to pass through the PSCT material 812 without being redirected or being redirected to a lesser degree than in FIG. 8B. In some embodiments, an electrical field generated by electrical power being applied to an adjustable light diffusing material may further cause the adjacent plates of liquid crystal molecules (as shown in FIG. 8A) to rotate such that liquid crystal molecules in adjacent plates are aligned, further allowing light to pass through the PSCT material without being redirected. As can be seen, light 824 exits adjustable light diffusing material 810 directed in a common direction.

In some embodiments, any of the adjustable light diffusing materials described in FIGS. 1-7 may include other types of liquid crystal materials, such as smectic phase liquid crystals or a polymer network liquid crystal (PNLC) material.

Figure 9A:
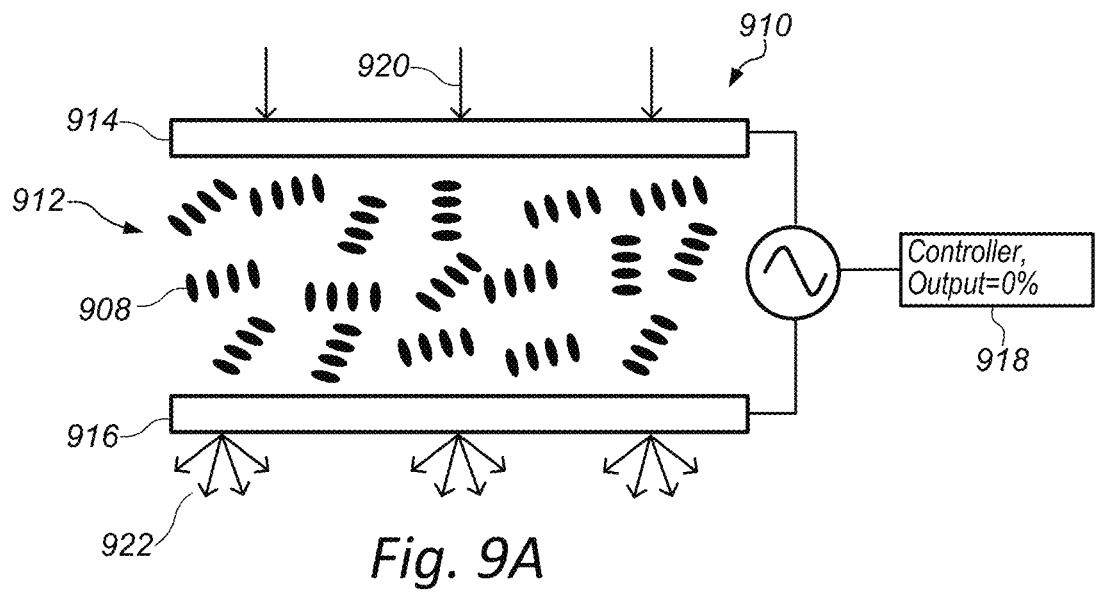
FIG. 9A-B illustrate an adjustable light diffusing material with liquid crystals in a smectic state that has light diffusing properties that are adjustable based on applying a current or voltage, according to some embodiments.
Figure 9B:
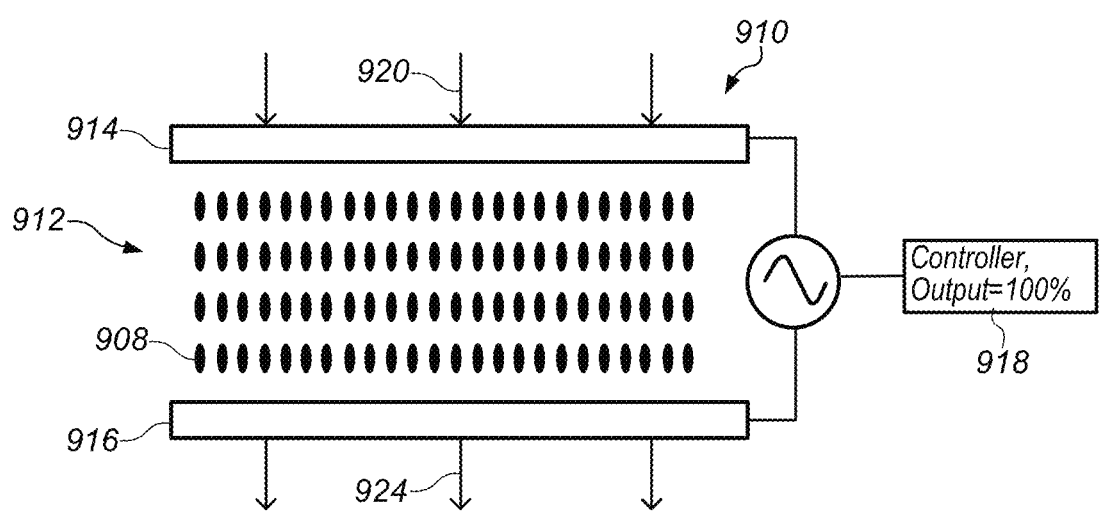

FIGS. 9A-9B illustrate an adjustable light diffusing material that includes smectic phase liquid crystals, according to some embodiments. Smectic phase liquid crystals may also include sheets of parallel liquid crystals. However, as opposed to cholesteric phase liquid crystals, the sheets of a smectic phase liquid crystal may be ordered such that each neighboring sheet is not rotated relative to another neighboring sheet, such as in the cholesteric phase. Smectic phase liquid crystals may also be non-uniformly arranged and oriented when electrical power is not being applied to an adjustable light diffusing material including the smectic phase liquid crystals. Also, applying an electrical field to an adjustable light diffusing material that includes smectic phase liquid crystals may cause the smectic liquid crystals to be ordered such that light can pass through the adjustable light diffusing material with less diffusion of the light.

As shown in FIGS. 9A and 9B, adjustable light diffusing material 910 includes smectic liquid crystal material 912 that includes smectic liquid crystals 908. Adjustable light diffusing material 910 and also includes transparent electrodes 914 and 916. For simplicity of illustration, adjustable light diffusing material 910 is illustrated in an energized state (FIG. 9B) and a non-energized state (FIG. 9A). However, in some embodiments, various states between fully energized and non-energized may be achieved by varying a voltage, current, or frequency of electrical power applied to the adjustable light diffusing material. In FIG. 9A, controller 918 is set to not provide electrical power to transparent electrodes 914 and 916. In the non-energized state, smectic liquid crystals 908 are non-uniformly arranged and oriented in smectic liquid crystal material 912. As light 920 passes through the smectic liquid crystal material 912, the light bounces off of smectic liquid crystals 908 and is diffused. As can be seen, light 922 exits adjustable light diffusing material 910 directed in multiple directions.

In contrast, in FIG. 9B electrical power is applied to transparent electrodes 914 and 916. This causes an electrical field to be generated across smectic liquid crystal material 912. The electrical field causes the smectic liquid crystals 908 to align in an organized manner that allows light to pass through the smectic liquid crystal material 912 without being redirected or being redirected to a lesser degree than in FIG. 9A. As can be seen, light 924 exits adjustable light diffusing material 910 directed in a common direction.

Figure 10A:
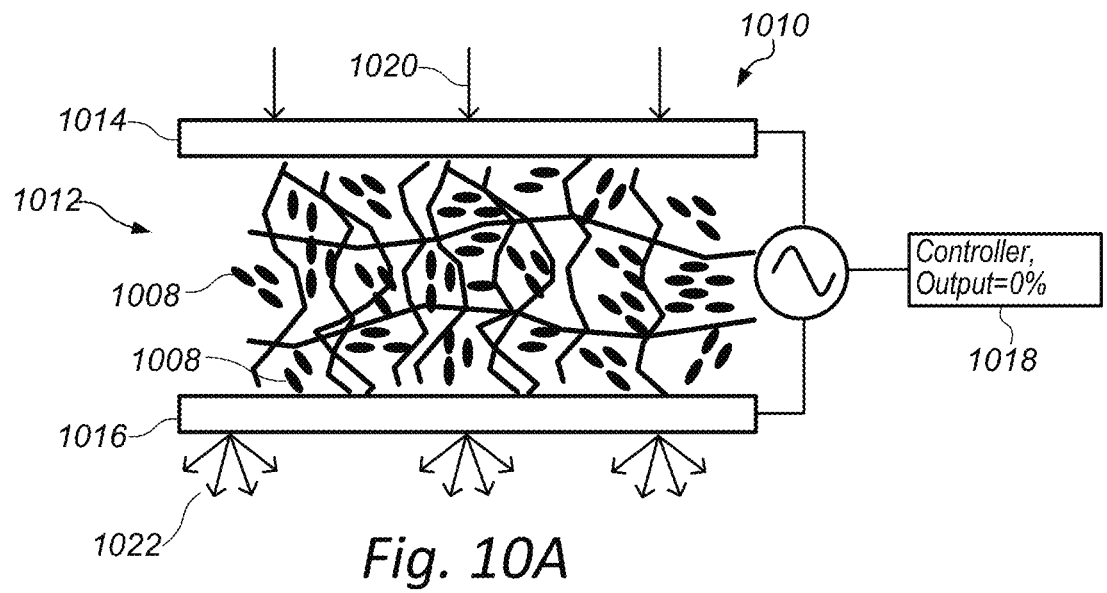
FIG. 10A-B illustrate a polymer network liquid crystal (PNLC) adjustable light diffusing material with light diffusing properties that are adjustable based on applying a current or voltage, according to some embodiments.
Figure 10B:
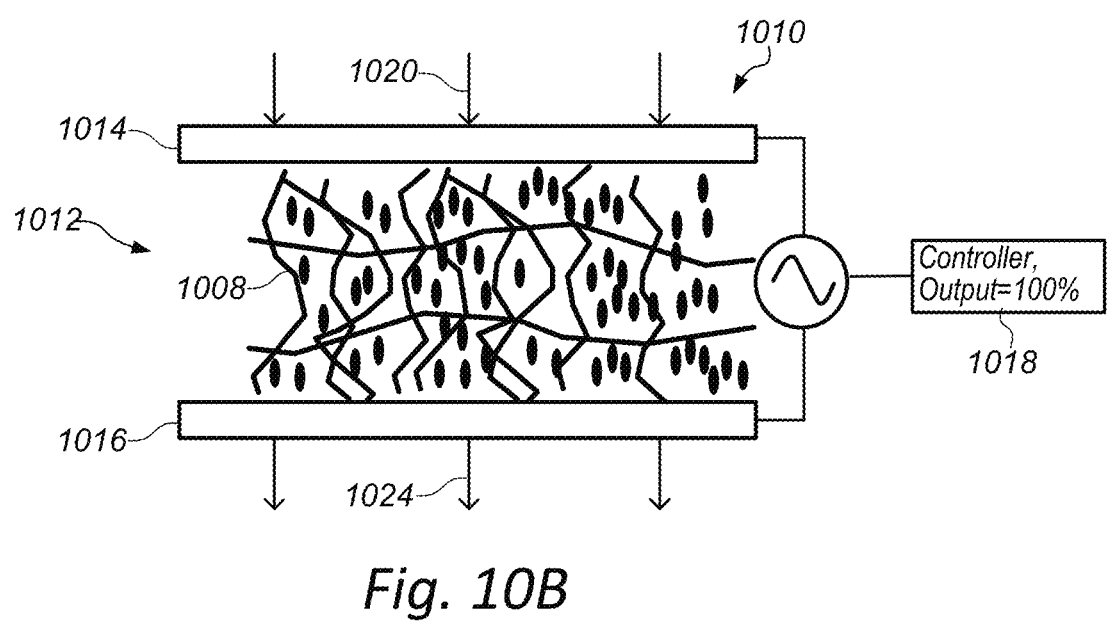

FIGS. 10A-10B illustrate an adjustable light diffusing material that includes a polymer network liquid crystal (PNLC), according to some embodiments. A PNLC material may include liquid crystals that are oriented in a non-organized manner when an electrical field is not being applied to the PNLC material. Furthermore, the liquid crystals of a PNLC material may be oriented in a uniform manner when an electrical field is applied. In the more uniform orientation, liquid crystals of a PNLC material may diffuse light to a lesser degree than when oriented in a non-uniform manner. In some embodiments, a PNLC may operate in a reverse manner. For example, in some embodiments a PNLC may include a particular type of phase of liquid crystals such that the liquid crystals of the PNLC are oriented in a uniform manner when no electrical field is applied and such that the liquid crystals of the PNLC are oriented in a non-uniform manner when an electrical field is applied.

FIGS. 10A-10B illustrate an adjustable light diffusing material that includes a polymer network liquid crystal (PNLC) material, according to some embodiments.

As shown in FIGS. 10A and 10B, adjustable light diffusing material 1010 includes smectic liquid crystal material 1012 that includes smectic liquid crystals 1008. Adjustable PNLC material 1012 and also includes transparent electrodes 1014 and 1016. For simplicity of illustration, adjustable light diffusing material 1010 is illustrated in an energized state (FIG. 10B) and a non-energized state (FIG. 10A). However, in some embodiments, various states between fully energized and non-energized may be achieved by varying a voltage, current, or frequency of electrical power applied to the adjustable light diffusing material. In FIG. 10A, controller 1018 is set to not provide electrical power to transparent electrodes 1014 and 1016. In the non-energized state, liquid crystals 1008 are non-uniformly arranged and oriented in PNLC material 1012. As light 1020 passes through the PNLC material 1012, the light bounces off of liquid crystals 1008 and is diffused. As can be seen, light 1022 exits adjustable light diffusing material 1010 directed in multiple directions.

In contrast, in FIG. 10B electrical power is applied to transparent electrodes 1014 and 1016. This causes an electrical field to be generated across PNLC material 1012. The electrical field causes liquid crystals 1008 to align in an organized manner that allows light to pass through the PNLC material 1012 without being redirected or being redirected to a lesser degree than in FIG. 10A. As can be seen, light 1024 exits adjustable light diffusing material 1010 directed in a common direction.

Polymer stabilized cholesteric textures, smectic phase liquid crystal materials, and polymer network liquid crystals are given as example materials that may be used in an adjustable light diffusing material. In some embodiments, other suitable materials with adjustable diffusion properties may be used. Furthermore, in some embodiments, a bi-stable liquid crystal may be used. For example, a cholesteric phase liquid crystal or a smectic phase liquid crystal may exhibit bi-stable properties. For example, a bi-stable liquid crystal material may initially be opaque when an electrical field is not applied to the bi-stable liquid crystal material. Subsequently an electrical field may be applied that causes the liquid crystal molecules of the bi-stable liquid crystal material to organize in a particular manner such that the bi-stable liquid crystal material is more translucent than prior to the electrical field being applied to the bi-stable liquid crystal material. Even after the electrical field is no longer applied to the bi-stable liquid crystal material, the bi-stable liquid crystal material may remain in the more translucent state. Subsequently, an electrical field may be applied to the bi-stable liquid crystal material that causes the liquid-crystals of the bi-stable liquid crystal material to re-organize into another arrangement. For example, the additional application of an electrical field may cause the liquid crystals to revert to a similar organization as prior to the first electrical field being applied to the bi-stable liquid crystal material. For example, the bi-stable liquid crystal material may revert to an opaque state. Thus, a bi-stable liquid crystal may remain in a particular state when electrical power is not being applied to the bi-stable liquid crystal and may change states when an electrical field is applied to the bi-stable liquid crystal material.

Additional Uses of a Light Source Module

In addition to illuminating a scene to be captured by a camera or video recorder, a light source module may be used as a flashlight, as an indicator to send visual notifications to users, as an emitter to transmit information via modulated light signals, or for other uses. When being used as a flashlight, an adjustable light diffusing material may be used to adjust a beam of light emitted from a light source module. For example, a user of a mobile device with an embedded light source module may desire to have a wide beam of light when searching through an area and may desire to have a focused beam of light when working in a fixed location. A light source module, such as any of light source modules described above may be used to adjust a beam of light when used in a flashlight mode. In some embodiments, an adjustable light diffusing material may be used in a flash light mode to adjust a beam of light from a light source module between a wide beam and a concentrated or narrow beam.

Figure 11A:
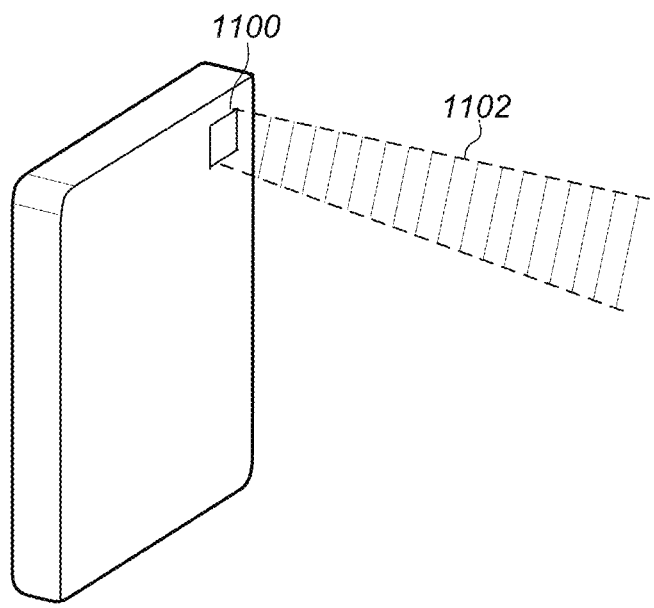
FIG. 11A-B illustrate a light source module embedded in a mobile computing device, according to some embodiments.
Figure 11B:
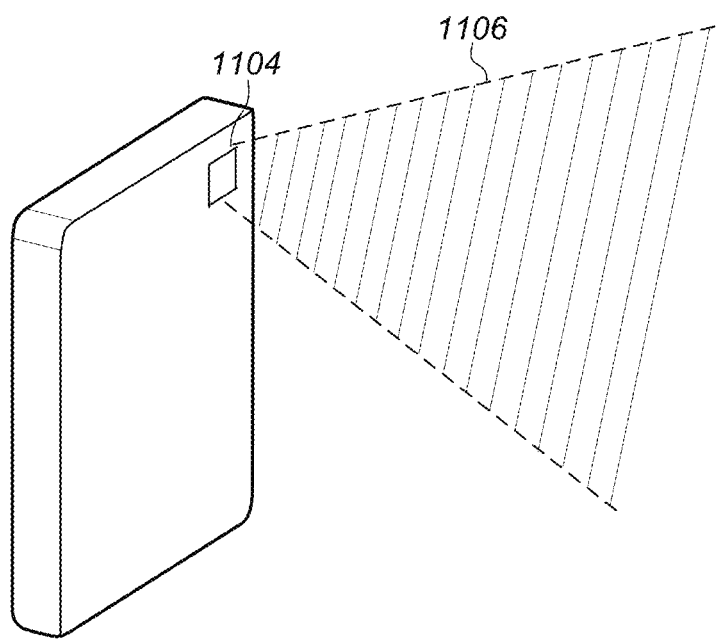

In some embodiments, a controller of a mobile device may interact with one or more other components of a mobile device to determine whether a light source module in a flash light mode should emit a wide beam of light or a concentrated or narrow beam of light. For example, a controller may interact with signals from one or more gyroscopes, accelerometers or other motion detecting devices to determine if a mobile device is scanning a wide area or is relatively still and focused on a single location. In response to determining that a mobile device is focused on a single location, a controller may switch from a wide beam mode to a narrow or concentrated light beam mode. In some embodiments, a controller may interact with a camera of a mobile device to detect objects in a scene and focus a light beam on one or more of the objects detected in the scene. For example, FIGS. 11A-B illustrates a light source module embedded in a mobile device in a flashlight mode. In FIG. 11A light source module 1100 is in a flashlight mode and in a narrow or concentrated beam mode. Light source module 1100 emits a narrow beam of light 1102. In FIG. 11B light source module 1104 is embedded in a mobile device and is in a flashlight mode and in a wide beam mode. Light source module 1104 emits a wide beam of light 1106. In some embodiments, light source modules may be embedded in a variety of devices including mobile computing devices such as phones, tablets, etc. and may be used in a flash light mode as described above.

Diffusion Control Methods

Figure 12:
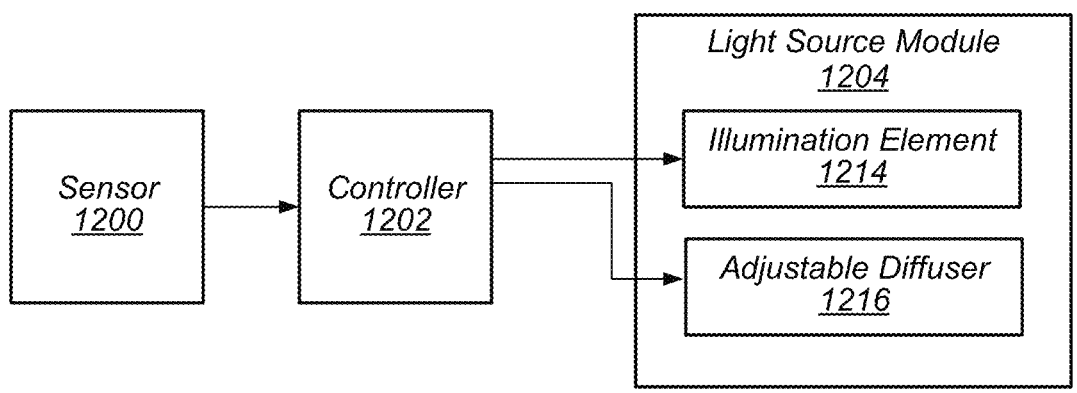
FIG. 12 illustrates a system including a controller that can adjust a level of diffusion of light emitted from a light source module, according to some embodiments.

FIG. 12 is a flowchart for controlling a light source module, according to some embodiments. A sensor, such as sensor 1200 detects a condition of a scene to be illuminated by a light source module. The sensor communicates with a controller, such as controller 1202, and the controller determines an illumination intensity for an illumination element and a level of diffusion for an adjustable light diffusing material of the light source module. A sensor may be a camera, a lighting detector, or other type of sensor that measures lighting conditions of a scene, camera settings, or distances to objects in a scene. In some embodiments, a controller, such as controller 1202, may be implemented in hardware or in software. In some embodiments, controller 1202 may be implemented by one or more processors and memory of a mobile device.

A light source module, such as light source module 1204, may comprise an illumination element 1214 and an adjustable light diffusing material 1216. In some embodiments, a controller, such as controller 1202 may instruct an illumination element to illuminate at a particular illumination intensity. For example, controller 1202 may instruct illumination element 1214 to illuminate with an 80% illumination intensity.

A controller, such as controller 1202, may send one or more signals to a light source module comprising an adjustable light diffusing material, such as adjustable light diffusing material 1216. A controller, such as controller 1202, may instruct an adjustable light diffusing material, such as adjustable light diffusing material 1216, to remain in an opaque state when light is not being emitted from a light source module, such as light source module 1204, and may instruct an adjustable light diffusing material, such as adjustable light diffusing material 1216, to adjust to a clear or transparent state when light is being emitted from a light source module, such as light source module 1204. Furthermore, a controller, such as controller 1202, may adjust an adjustable light diffusing material, such as adjustable light diffusing material 1216, to a particular diffusion level based on a level of inclusion of a wide-angle lens system field of view or a level of inclusion of a telephoto lens system field of view into a composite field of view, based on a distance to a scene to be illuminated by the light source module, based on a zoom level, based on a selected camera mode, or any combination thereof. Any of the light source modules described above in regards to FIGS. 1-11 may receive one or more signals from a controller 1202.

Figure 13:
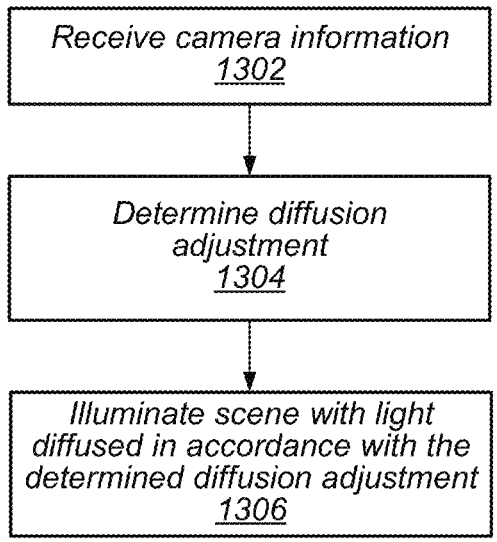
FIG. 13 is a flowchart of a method for adjusting a level of diffusion by a controller, according to some embodiments.

FIG. 13 is a flowchart of a method for adjusting the diffusion of light emitted from a light source module, according to some embodiments. Such a method can be implemented with regard to any of the above embodiments, including any of the above embodiments of light source modules. The method can be at least partially implemented by one or more light source modules based on command signals received from one or more computer systems. In some embodiments, the method can be at least partially implemented by one or more computer systems.

At 1302, an input for adjusting diffusion of light from a light source module is received. In some embodiments, the input may be autofocus information from a camera associated with a light source module or camera zoom settings. In some embodiments, the input may be a level of inclusion of a wide-angle lens system field of view or a telephoto lens system field of view in a composite camera field of view, such as a field of view of an image to be captured by a camera arrangement including multiple lens systems with different fields of view. In some embodiments, the input may be from a sensor that detects a distance to a scene, a camera that detects subjects in a scene, or from another source. In some embodiments, the input may be from a user interface that allows a user to select between a plurality of modes such as a wide angle mode or a telephoto mode. In some embodiments the input may include a combination of the above described inputs.

In some embodiments, a controller, such as controller 1202 described in FIG. 12, determines an estimated distance to a scene in a camera field of view that is to be illuminated by a light source module. In some embodiments, the controller may be included in a camera controller or may be a separate controller associated with or included in a light source module. The controller may be part of a mobile device in which a light source module is embedded.

At 1304, the controller determines a level of diffusion to be used for light emitted from the light source module to illuminate the scene. For example, in some embodiments, a relationship that is inversely proportional to the distance squared may be used to determine the level of diffusion. In some embodiments, other relationships may be used. In some embodiments, a level of diffusion may be determined based on distance and lighting conditions of a scene to be illuminated. In some embodiments, a level of diffusion may be determined based on a selected camera mode, such as a wide-angle mode or a telephoto mode. In some embodiments, a level of diffusion may be determined based on a selected zoom level. In some embodiments, a level of diffusion may be determined based on a level of inclusion of a wide-angle lens system field of view or a telephoto lens system field of view in a composite camera field of view.

At 1308, one or more control signals is sent to a light source module to illuminate the scene in accordance with a determined diffusivity adjustment. In some embodiments the one or more control signals may include a control signal to adjust the diffusing property of an adjustable light diffusing material. For example, a control signal may include the controller outputs described in FIGS. 1A-C, 2A-B, 4A-D, 6-12, and 14. In some embodiments, the one or more control signals may also include a control signal to adjust an illumination intensity of an illumination element. For example individual illumination elements may have adjustable illumination intensities.

Figure 14:
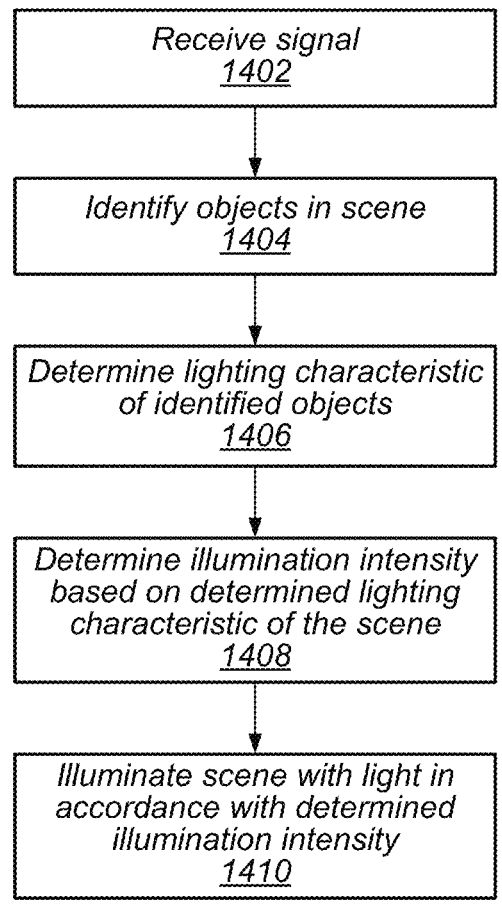
FIG. 14 is a flowchart of a method for adjusting an illumination intensity by a controller, according to some embodiments.

FIG. 14 is a flowchart of a method of adjusting the illumination intensity of light emitted from a light source module, according to some embodiments.

At 1402, a signal is received. For example, the signal may be from a camera that is part of a mobile computing device that includes an embedded light source module. In some embodiments, a light source module may be separate from a camera or mobile device or may be coupled to a camera or mobile device without being embedded in the camera or the mobile device. The signal may include sensitivity settings of the camera, such as ISO settings, shutter speed settings, etc.

At 1404, objects or subjects in a scene are identified. A controller, such as controller 1202 described above may include software that identifies subjects in a scene. For example, the controller may use facial recognition technology to identify people in a scene. In some embodiments, software components in a mobile computing device may identify objects or subjects in a scene and communicate the results to a controller, such as controller 1202. In some embodiments, step 1404 may be omitted and illumination settings may be determined based on camera settings without identifying particular objects in a scene.

At 1406, lighting characteristics are determined for the scene or for objects or subjects identified in a scene. A controller, such as controller 1202, may use signal inputs such as signals from a lighting detector to determine lighting conditions. A controller, such as controller 1202, may also use signal inputs that correspond to a distance from a mobile computing device to the identified objects or subjects in a scene. In some embodiments, a mobile computing device may use a camera to identify objects or subjects in a scene and to determine relative distances to the objects or subjects. In some embodiments, a mobile computing device may use input from a camera of the mobile device to determine lighting characteristics of identified objects or subjects in a scene, such as a selected zoom level. In some embodiments, a controller may use camera sensitivity settings such as ISO settings to determine lighting conditions.

At 1408, lighting adjustments for a scene are determined based on the lighting characteristics for the scene or for objects or subjects identified in the scene, one or more distances to the objects or subjects in the scene, or the selected zoom level. Adjustments may include adjusting the illumination intensity of one or more illumination elements that are to be used to illuminate a scene. A controller, such as controller 1202, may make other adjustments when a light source module is used in a flashlight mode, as an indicator to send visual notifications to users, as an emitter to transmit information via modulated light signals, or for other uses.

At 1410, one or more control signals are sent to a light source module to illuminate illumination elements in accordance with the illumination intensity determined at step 1408. In some embodiments, the one or more signals may include current or voltage that supplies power to the illumination elements to cause the illumination elements to illuminate or causes an adjustable light diffusing material to adjust its diffusion properties. In some embodiments the one or more signals may include instructions that are sent to a light source module that causes illumination elements and adjustable light diffusing materials to illuminate or adjust in accordance with the one or more control signals.

Multifunction Device Examples

Embodiments of electronic devices in which embodiments of light source modules, camera modules, light diffusion control modules, etc. as described herein may be used, user interfaces for such devices, and associated processes for using such devices are described. As noted above, in some embodiments, light source modules, camera modules, light diffusion control modules, etc. can be included in a mobile computing device which can include a camera device. In some embodiments, the device is a portable communications device, such as a mobile telephone, that also contains other functions, such as PDA and/or music player functions. Other portable electronic devices, such as laptops, cell phones, pad devices, or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera device.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use one or more common physical user-interface devices, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with cameras. FIG. 15B is a block diagram illustrating portable multifunction device 1500 with camera 1570 in accordance with some embodiments. FIG. 15B illustrates camera 1570, which is sometimes called an "optical sensor" for convenience, and may also be known as or called an optical sensor system. In addition, multifunction device 1500 includes optical sensor 1564 illustrated in FIG. 15A on an opposite side of multifunction device 1500 from camera 1570.

Figure 15A:
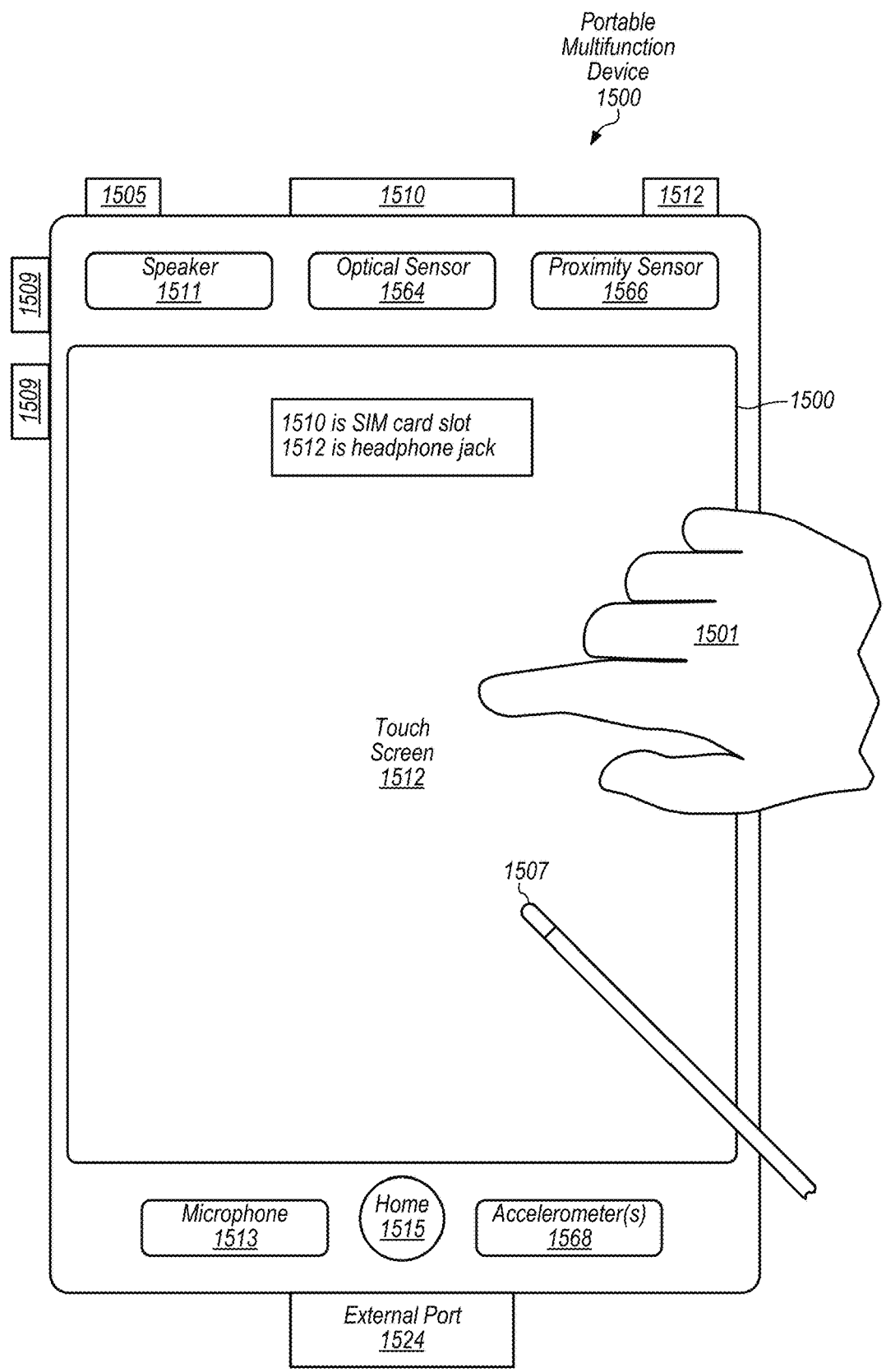
FIG. 15A-C illustrate a portable multifunction device with an embedded light source module, according to some embodiments.
Figure 15B:
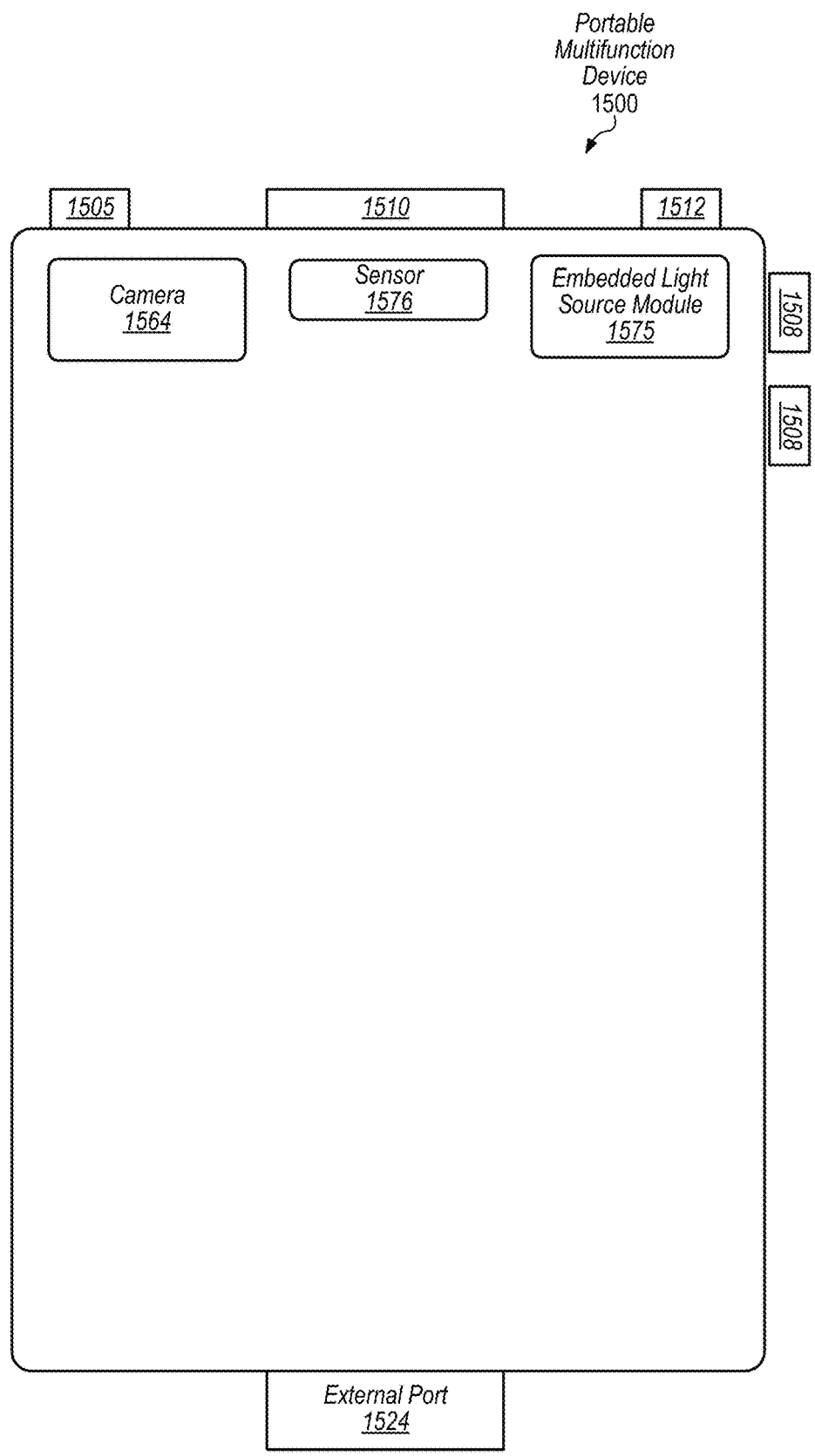
Figure 15C:
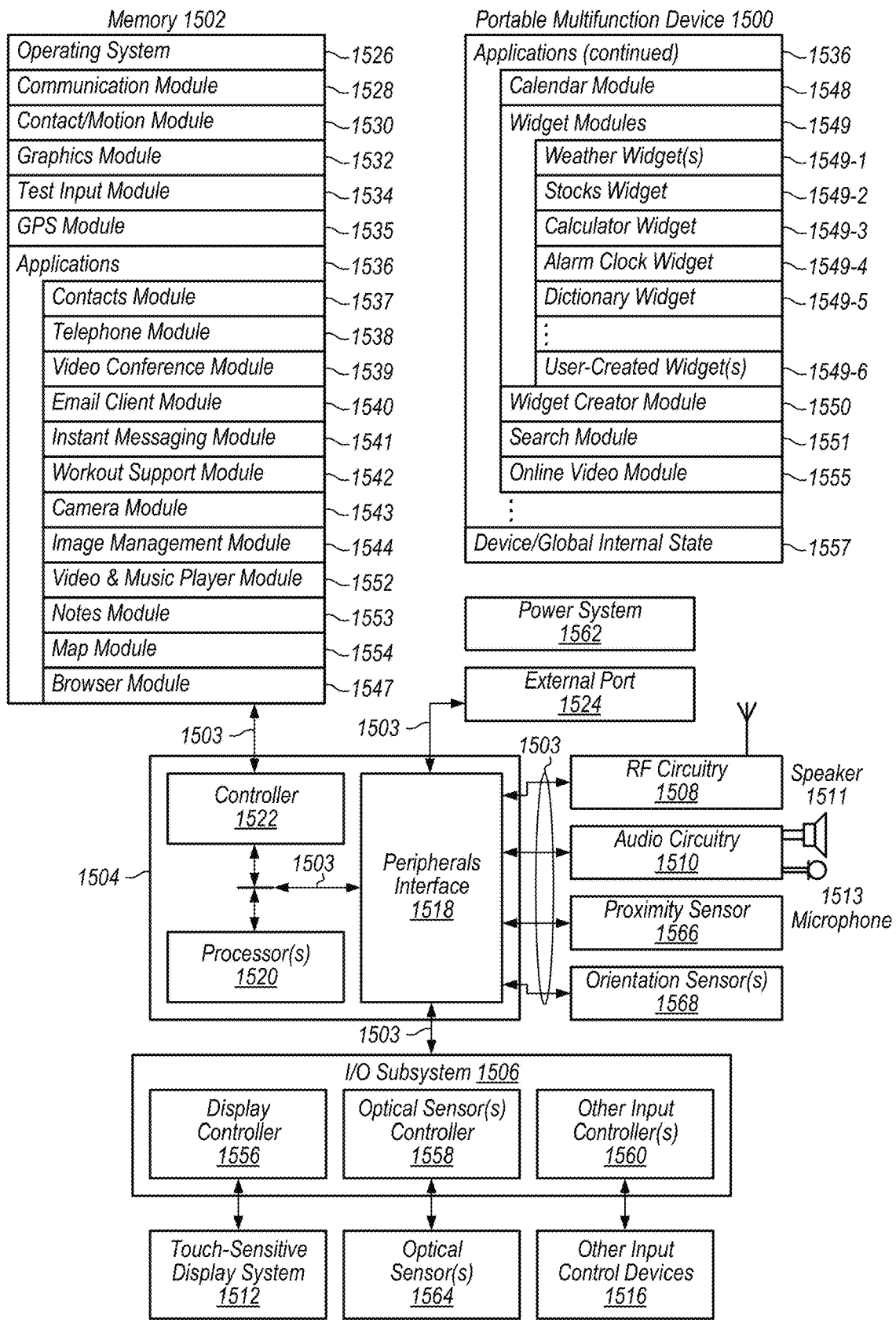

Referring to FIG. 15C, device 1500 may include memory 1502 (which may include one or more computer readable storage mediums), memory controller 1522, one or more processing units (CPU's) 1520, peripherals interface 1518, RF circuitry 1508, audio circuitry 1510, speaker 1511, touch-sensitive display system 1512, microphone 1513, input/output (I/O) subsystem 1506, other input or control devices 1516, and external port 1524. Device 1500 may include one or more optical sensors 1564. These components may communicate over one or more communication buses or signal lines 1503.

It should be appreciated that device 1500 is only one example of a portable multifunction device, and that device 1500 may have more or fewer components than shown, may combine two or more components, or may have a different configuration or arrangement of the components. The various components shown in FIG. 15C may be implemented in hardware, software, or a combination of hardware and software, including one or more signal processing and/or application specific integrated circuits.

Memory 1502 may include high-speed random access memory and may also include non-volatile memory, such as one or more magnetic disk storage devices, flash memory devices, or other non-volatile solid-state memory devices. Access to memory 1502 by other components of device 1500, such as CPU 1520 and the peripherals interface 1518, may be controlled by memory controller 1522.

Peripherals interface 1518 can be used to couple input and output peripherals of the device to CPU 1520 and memory 1502. The one or more processors 1520 run or execute various software programs and/or sets of instructions stored in memory 1502 to perform various functions for device 1500 and to process data.

In some embodiments, peripherals interface 1518, CPU 1520, and memory controller 1522 may be implemented on a single chip, such as chip 1504. In some other embodiments, they may be implemented on separate chips.

RF (radio frequency) circuitry 1508 receives and sends RF signals, also called electromagnetic signals. RF circuitry 1508 converts electrical signals to/from electromagnetic signals and communicates with communications networks and other communications devices via the electromagnetic signals. RF circuitry 1508 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1508 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1510, speaker 1511, and microphone 1513 provide an audio interface between a user and device 1500. Audio circuitry 1510 receives audio data from peripherals interface 1518, converts the audio data to an electrical signal, and transmits the electrical signal to speaker 1511. Speaker 1511 converts the electrical signal to human-audible sound waves. Audio circuitry 1510 also receives electrical signals converted by microphone 1513 from sound waves. Audio circuitry 1510 converts the electrical signal to audio data and transmits the audio data to peripherals interface 1518 for processing. Audio data may be retrieved from and/or transmitted to memory 1502 and/or RF circuitry 1508 by peripherals interface 1518. In some embodiments, audio circuitry 1510 also includes a headset jack (e.g., 1512, FIG. 15A-B). The headset jack provides an interface between audio circuitry 1510 and removable audio input/output peripherals, such as output-only headphones or a headset with both output (e.g., a headphone for one or both ears) and input (e.g., a microphone).

I/O subsystem 1506 couples input/output peripherals on device 1500, such as touch screen 1512 and other input control devices 1516, to peripherals interface 1518. I/O subsystem 1506 may include display controller 1556 and one or more input controllers 1560 for other input or control devices. The one or more input controllers 1516 receive/send electrical signals from/to other input or control devices 1516. The other input control devices 1516 may include physical buttons (e.g., push buttons, rocker buttons, etc.), dials, slider switches, joysticks, click wheels, and so forth. In some alternative embodiments, input controller(s) 1560 may be coupled to any (or none) of the following: a keyboard, infrared port, USB port, and a pointer device such as a mouse. The one or more buttons (e.g., 1508, FIG.

15A-B) may include an up/down button for volume control of speaker 1511 and/or microphone 1513. The one or more buttons may include a push button (e.g., 1505, FIG. 15A-B).

Touch-sensitive display 1512 provides an input interface and an output interface between the device and a user. Display controller 1556 receives and/or sends electrical signals from/to touch screen 1512. Touch screen 1512 displays visual output to the user. The visual output may include graphics, text, icons, video, and any combination thereof (collectively termed "graphics"). In some embodiments, some or all of the visual output may correspond to user-interface objects.

Touch screen 1512 has a touch-sensitive surface, sensor or set of sensors that accepts input from the user based on haptic and/or tactile contact. Touch screen 1512 and display controller 1556 (along with any associated modules and/or sets of instructions in memory 1502) detect contact (and any movement or breaking of the contact) on touch screen 1512 and converts the detected contact into interaction with user-interface objects (e.g., one or more soft keys, icons, web pages or images) that are displayed on touch screen 1512. In an example embodiment, a point of contact between touch screen 1512 and the user corresponds to a finger of the user.

Touch screen 1512 may use LCD (liquid crystal display) technology, LPD (light emitting polymer display) technology, or LED (light emitting diode) technology, although other display technologies may be used in other embodiments. Touch screen 1512 and display controller 1556 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1512. In an example embodiment, projected mutual capacitance sensing technology may be used.

Touch screen 1512 may have a video resolution in excess of 100 dots per inch (dpi). In some embodiments, the touch screen has a video resolution of approximately 160 dpi. The user may make contact with touch screen 1512 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1500 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1512 or an extension of the touch-sensitive surface formed by the touch screen.

Device 1500 also includes power system 1562 for powering the various components. Power system 1562 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1500 may also include one or more optical sensors or cameras 1564. FIG. 15C shows an optical sensor coupled to optical sensor controller 1558 in I/O subsystem 1506. Optical sensor 1564 may include charge-coupled device (CCD) or complementary metal-oxide semiconductor (CMOS) phototransistors. Optical sensor 1564 receives light from the environment, projected through one or more lens, and converts the light to data representing an image. In conjunction with imaging module 1543 (also called a camera module), optical sensor 1564 may capture still images or video. In some embodiments, an optical sensor is located on the back of device 1500, opposite touch screen display 1512 on the front of the device, so that the touch screen display may be used as a viewfinder for still and/or video image acquisition. In some embodiments, another optical sensor is located on the front of the device so that the user's image may be obtained for videoconferencing while the user views the other videoconference participants on the touch screen display.

Device 1500 may also include one or more proximity sensors 1566. FIG. 15C shows proximity sensor 1566 coupled to peripherals interface 1518. Alternatively, proximity sensor 1566 may be coupled to input controller 1560 in I/O subsystem 1506. In some embodiments, the proximity sensor turns off and disables touch screen 1512 when the multifunction device is placed near the user's ear (e.g., when the user is making a phone call).

Device 1500 includes one or more orientation sensors 1568. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1500. In some embodiments, the one or more orientation sensors include any combination of orientation/rotation sensors. FIG. 15C shows the one or more orientation sensors 1568 coupled to peripherals interface 1518. Alternatively, the one or more orientation sensors 1568 may be coupled to an input controller 1560 in I/O subsystem 1506. In some embodiments, information is displayed on the touch screen display in a portrait view or a landscape view based on an analysis of data received from the one or more orientation sensors.

In some embodiments, the software components stored in memory 1502 include operating system 1526, communication module (or set of instructions) 1528, contact/motion module (or set of instructions) 1530, graphics module (or set of instructions) 1532, text input module (or set of instructions) 1534, Global Positioning System (GPS) module (or set of instructions) 1535, and applications (or sets of instructions) 1536. Furthermore, in some embodiments memory 1502 stores device/global internal state 1557. Device/global internal state 1557 includes one or more of: active application state, indicating which applications, if any, are currently active; display state, indicating what applications, views or other information occupy various regions of touch screen display 1512; sensor state, including information obtained from the device's various sensors and input control devices 1516; and location information concerning the device's location and/or attitude.

Operating system 1526 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1528 facilitates communication with other devices over one or more external ports 1524 and also includes various software components for handling data received by RF circuitry 1508 and/or external port 1524. External port 1524 (e.g., Universal Serial Bus (USB), FIRE-WIRE, etc.) is adapted for coupling directly to other devices or indirectly over a network (e.g., the Internet, wireless LAN, etc.).

Contact/motion module 1530 may detect contact with touch screen 1512 (in conjunction with display controller 1556) and other touch sensitive devices (e.g., a touchpad or physical click wheel). Contact/motion module 1530 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1530 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1530 and display controller 1556 detect contact on a touchpad.

Contact/motion module 1530 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1532 includes various known software components for rendering and displaying graphics on touch screen 1512 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1532 stores data representing graphics to be used. Each graphic may be assigned a corresponding code. Graphics module 1532 receives, from applications etc., one or more codes specifying graphics to be displayed along with, if necessary, coordinate data and other graphic property data, and then generates screen image data to output to display controller 1556.

Text input module 1534, which may be a component of graphics module 1532, provides soft keyboards for entering text in various applications (e.g., contacts 1537, e-mail 1540, IM 1541, browser 1547, and any other application that needs text input).

GPS module 1535 determines the location of the device and provides this information for use in various applications (e.g., to telephone 1538 for use in location-based dialing, to camera module 1543 as picture/video metadata, and to applications that provide location-based services such as weather widgets, local yellow page widgets, and map/navigation widgets).

Applications 1536 may include the following modules (or sets of instructions), or a subset or superset thereof:
- contacts module 1537 (sometimes called an address book or contact list);
- telephone module 1538;
- video conferencing module 1539;
- e-mail client module 1540;
- instant messaging (IM) module 1541;
- workout support module 1542;
- camera module 1543 for still and/or video images;
- image management module 1544;
- browser module 1547;
- calendar module 1548;
- widget modules 1549, which may include one or more of: weather widget 1549-1, stocks widget 1549-2, calculator widget 1549-3, alarm clock widget 1549-4, dictionary widget 1549-5, and other widgets obtained by the user, as well as user-created widgets 1549-6;
- widget creator module 1550 for making user-created widgets 1549-6;
- search module 1551;
- video and music player module 1552, which may be made up of a video player module and a music player module;
- notes module 1553;
- map module 1554; and/or
- online video module 1555.

Examples of other applications 1536 that may be stored in memory 1502 include other word processing applications, other image editing applications, drawing applications, presentation applications, JAVA-enabled applications, encryption, digital rights management, voice recognition, and voice replication.

In conjunction with touch screen 1512, display controller 1556, contact module 1530, graphics module 1532, and text input module 1534, contacts module 1537 may be used to manage an address book or contact list (e.g., stored in application internal state 1592 of contacts module 1537 in memory 1502), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1538, video conference 1539, e-mail 1540, or IM 1541; and so forth.

In conjunction with RF circuitry 1508, audio circuitry 1510, speaker 1511, microphone 1513, touch screen 1512, display controller 1556, contact module 1530, graphics module 1532, and text input module 1534, telephone module 1538 may be used to enter a sequence of characters corresponding to a telephone number, access one or more telephone numbers in address book 1537, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1508, audio circuitry 1510, speaker 1511, microphone 1513, touch screen 1512, display controller 1556, optical sensor 1564, optical sensor controller 1558, contact module 1530, graphics module 1532, text input module 1534, contact list 1537, and telephone module 1538, videoconferencing module 1539 includes executable instructions to initiate, conduct, and terminate a video conference between a user and one or more other participants in accordance with user instructions.

In conjunction with RF circuitry 1508, touch screen 1512, display controller 1556, contact module 1530, graphics module 1532, and text input module 1534, e-mail client module 1540 includes executable instructions to create, send, receive, and manage e-mail in response to user instructions. In conjunction with image management module 1544, e-mail client module 1540 makes it very easy to create and send e-mails with still or video images taken with camera module 1543.

In conjunction with RF circuitry 1508, touch screen 1512, display controller 1556, contact module 1530, graphics module 1532, and text input module 1534, the instant messaging module 1541 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1508, touch screen 1512, display controller 1556, contact module 1530, graphics module 1532, text input module 1534, GPS module 1535, map module 1554, and music player module 1546, workout support module 1542 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1512, display controller 1556, optical sensor(s) 1564, optical sensor controller 1558, embedded light source module 1575, sensor 1576, contact module 1530, graphics module 1532, and image management module 1544, camera module 1543 includes executable instructions to capture still images or video (including a video stream) and store them into memory 1502, modify characteristics of a still image or video, or delete a still image or video from memory 1502.

In conjunction with touch screen 1512, display controller 1556, contact module 1530, graphics module 1532, text input module 1534, embedded light source module 1575, sensor 1576, and camera module 1543, image management module 1544 includes executable instructions to arrange, modify (e.g., edit), or otherwise manipulate, label, delete, present (e.g., in a digital slide show or album), and store still and/or video images.

In conjunction with RF circuitry 1508, touch screen 1512, display system controller 1556, contact module 1530, graphics module 1532, and text input module 1534, browser module 1547 includes executable instructions to browse the Internet in accordance with user instructions, including searching, linking to, receiving, and displaying web pages or portions thereof, as well as attachments and other files linked to web pages.

In conjunction with RF circuitry 1508, touch screen 1512, display system controller 1556, contact module 1530, graphics module 1532, text input module 1534, e-mail client module 1540, and browser module 1547, calendar module 1548 includes executable instructions to create, display, modify, and store calendars and data associated with calendars (e.g., calendar entries, to do lists, etc.) in accordance with user instructions.

In conjunction with RF circuitry 1508, touch screen 1512, display system controller 1556, contact module 1530, graphics module 1532, text input module 1534, and browser module 1547, widget modules 1549 are mini-applications that may be downloaded and used by a user (e.g., weather widget 1549-1, stocks widget 1549-2, calculator widget 15493, alarm clock widget 1549-4, and dictionary widget 1549-5) or created by the user (e.g., user-created widget 1549-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1508, touch screen 1512, display system controller 1556, contact module 1530, graphics module 1532, text input module 1534, and browser module 1547, the widget creator module 1550 may be used by a user to create widgets (e.g., turning a user-specified portion of a web page into a widget).

In conjunction with touch screen 1512, display system controller 1556, contact module 1530, graphics module 1532, and text input module 1534, search module 1551 includes executable instructions to search for text, music, sound, image, video, and/or other files in memory 1502 that match one or more search criteria (e.g., one or more user-specified search terms) in accordance with user instructions.

In conjunction with touch screen 1512, display system controller 1556, contact module 1530, graphics module 1532, audio circuitry 1510, speaker 1511, RF circuitry 1508, and browser module 1547, video and music player module 1552 includes executable instructions that allow the user to download and play back recorded music and other sound files stored in one or more file formats, such as MP3 or AAC files, and executable instructions to display, present or otherwise play back videos (e.g., on touch screen 1512 or on an external, connected display via external port 1524). In some embodiments, device 1500 may include the functionality of an MP3 player.

In conjunction with touch screen 1512, display controller 1556, contact module 1530, graphics module 1532, and text input module 1534, notes module 1553 includes executable instructions to create and manage notes, to do lists, and the like in accordance with user instructions.

In conjunction with RF circuitry 1508, touch screen 1512, display system controller 1556, contact module 1530, graphics module 1532, text input module 1534, GPS module 1535, and browser module 1547, map module 1554 may be used to receive, display, modify, and store maps and data associated with maps (e.g., driving directions; data on stores and other points of interest at or near a particular location; and other location-based data) in accordance with user instructions.

In conjunction with touch screen 1512, display system controller 1556, contact module 1530, graphics module 1532, audio circuitry 1510, speaker 1511, RF circuitry 1508, text input module 1534, e-mail client module 1540, and browser module 1547, online video module 1555 includes instructions that allow the user to access, browse, receive (e.g., by streaming and/or download), play back (e.g., on the touch screen or on an external, connected display via external port 1524), send an e-mail with a link to a particular online video, and otherwise manage online videos in one or more file formats, such as H.264. In some embodiments, instant messaging module 1541, rather than e-mail client module 1540, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1502 may store a subset of the modules and data structures identified above. Furthermore, memory 1502 may store additional modules and data structures not described above.

In some embodiments, device 1500 is a device where operation of a predefined set of functions on the device is performed exclusively through a touch screen and/or a touchpad. By using a touch screen and/or a touchpad as the primary input control device for operation of device 1500, the number of physical input control devices (such as push buttons, dials, and the like) on device 1500 may be reduced.

The predefined set of functions that may be performed exclusively through a touch screen and/or a touchpad include navigation between user interfaces. In some embodiments, the touchpad, when touched by the user, navigates device 1500 to a main, home, or root menu from any user interface that may be displayed on device 1500. In such embodiments, the touchpad may be referred to as a "menu button." In some other embodiments, the menu button may be a physical push button or other physical input control device instead of a touchpad.

FIG. 15A-B illustrates a portable multifunction device 1500 having a touch screen 1512 in accordance with some embodiments. The touch screen may display one or more graphics within a user interface (UI). In this embodiment, as well as others described below, a user may select one or more of the graphics by making a gesture on the graphics, for example, with one or more fingers 1501 (not drawn to scale in the Figure) or one or more styluses 1507 (not drawn to scale in the figure).

Device 1500 may also include one or more physical buttons, such as "home" or menu button 1515. As described previously, menu button 1515 may be used to navigate to any application 1536 in a set of applications that may be executed on device 1500. Alternatively, in some embodiments, the menu button is implemented as a soft key in a graphics user interface (GUI) displayed on touch screen 1512.

In one embodiment, device 1500 includes touch screen 1512, menu button 1515, push button 1505 for powering the device on/off and locking the device, volume adjustment button(s) 1509, Subscriber Identity Module (SIM) card slot 1510, head set jack 1512, and docking/charging external port 1524. Push button 1505 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1500 also may accept verbal input for activation or deactivation of some functions through microphone 1513.

It should be noted that, although many of the examples herein are given with reference to optical sensor/camera 1564 (on the front of a device), a rear-facing camera or optical sensor that is pointed opposite from the display may be used instead of or in addition to an optical sensor/camera 1564 on the front of a device.

Example Computer System

Figure 16:
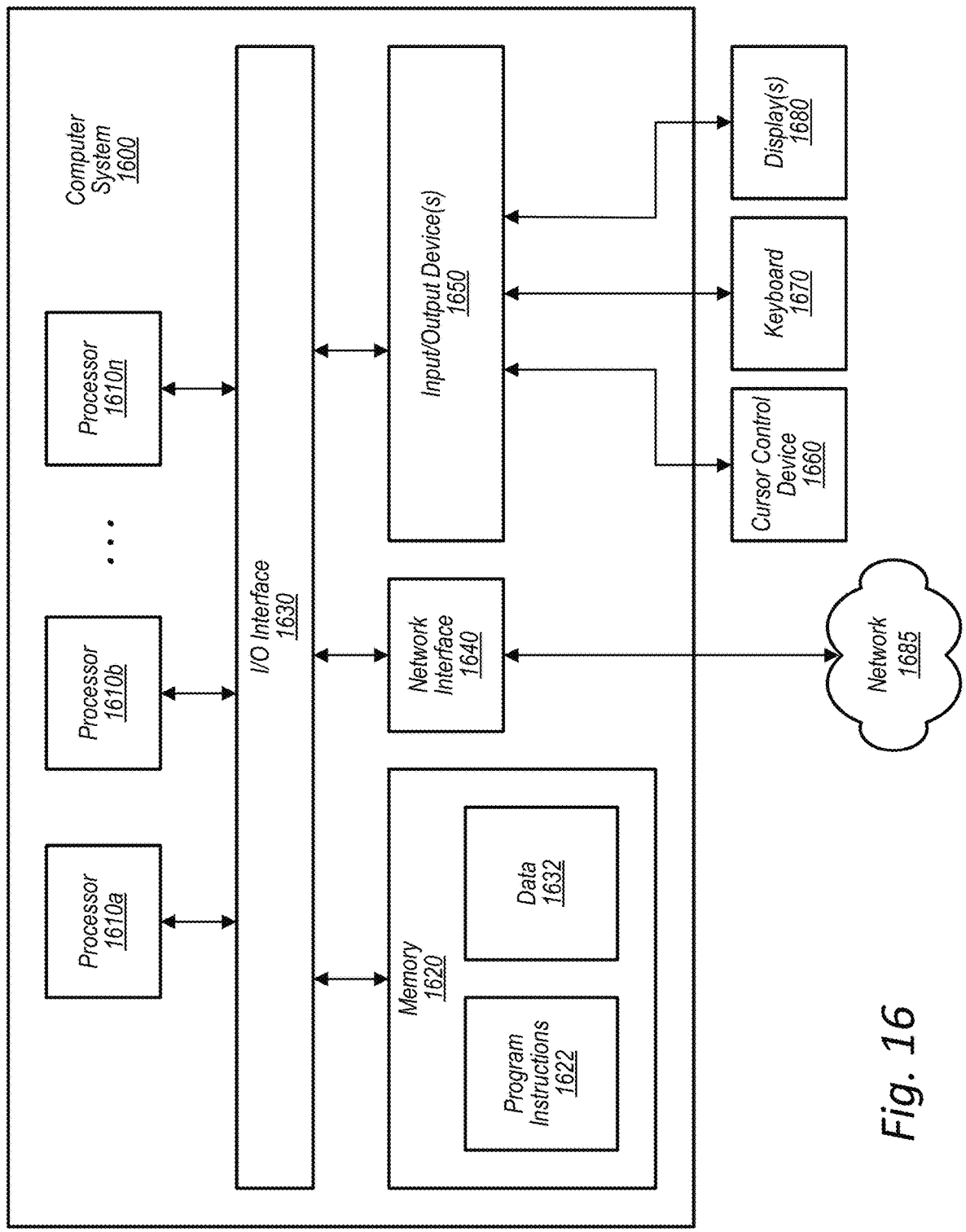
FIG. 16 illustrates an example computer system, according to some embodiments.

FIG. 16 illustrates an example computer system 1600 that may be configured to include or execute any or all of the embodiments described above. In different embodiments, computer system 1600 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a light source module or a light source module controller as described herein, may be executed in one or more computer systems 1600, which may interact with various other devices. Note that any component, action, or functionality described above with respect to FIGS. 1 through 15 may be implemented on one or more computers configured as computer system 1600 of FIG. 16, according to various embodiments. In the illustrated embodiment, computer system 1600 includes one or more processors 1610 coupled to a system memory 1620 via an input/output (I/O) interface 1630. Computer system 1600 further includes a network interface 1640 coupled to I/O interface 1630, and one or more input/output devices 1650, such as cursor control device 1660, keyboard 1670, and display(s) 1680. In some cases, it is contemplated that embodiments may be implemented using a single instance of computer system 1600, while in other embodiments multiple such systems, or multiple nodes making up computer system 1600, may be configured to host different portions or instances of embodiments. For example, in one embodiment some elements may be implemented via one or more nodes of computer system 1600 that are distinct from those nodes implementing other elements.

In various embodiments, computer system 1600 may be a uniprocessor system including one processor 1610, or a multiprocessor system including several processors 1610 (e.g., two, four, eight, or another suitable number). Processors 1610 may be any suitable processor capable of executing instructions. For example, in various embodiments processors 1610 may be general-purpose or embedded processors implementing any of a variety of instruction set architectures (ISAs), such as the x8 18, PowerPC, SPARC, or MIPS ISAs, or any other suitable ISA. In multiprocessor systems, each of processors 1610 may commonly, but not necessarily, implement the same ISA.

System memory 1620 may be configured to store control program instructions 1622 and/or control data accessible by processor 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions 1622 may be configured to implement a control application incorporating any of the functionality described above. Additionally, existing control data of memory 1620 may include any of the information or data structures described above. In some embodiments, program instructions and/or data may be received, sent or stored upon different types of computer-accessible media or on similar media separate from system memory 1620 or computer system 1600. While computer system 1600 is described as implementing the functionality of functional blocks of previous Figures, any of the functionality described herein may be implemented via such a computer system.

In one embodiment, I/O interface 1630 may be configured to coordinate I/O traffic between processor 1610, system memory 1620, and any peripheral devices in the device, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices attached to a network 1685 (e.g., carrier or agent devices) or between nodes of computer system 1600. Network 1685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or accessing data by one or more computer systems 1600. Multiple input/output devices 1650 may be present in computer system 1600 or may be distributed on various nodes of computer system 1600. In some embodiments, similar input/output devices may be separate from computer system 1600 and may interact with one or more nodes of computer system 1600 through a wired or wireless connection, such as over network interface 1640.

As shown in FIG. 16, memory 1620 may include program instructions 1622, which may be processor-executable to implement any element or action described above. In one embodiment, the program instructions may implement the methods described above. In other embodiments, different elements and data may be included. Note that data may include any data or information described above.

Those skilled in the art will appreciate that computer system 1600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1600 may be transmitted to computer system 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A mobile computing device, comprising:
a camera arrangement comprising:
  a first lens system having a first field of view; and
  a second lens system having a second field of view, wherein:
    at least a portion of the second field of view overlaps the first field of view; and
    at least a portion of the first field of view does not overlap the second field of view;
  wherein the camera arrangement is configured to output a first image having a third field of view based on a selected zoom level for the camera arrangement selected from a plurality of zoom levels supported by the camera arrangement;
a light source module comprising:
  one or more illumination elements configured to emit light; and
  an adjustable light diffusing material configured to diffuse light emitted from the one or more illumination elements by a selected diffusion level, selected from a plurality of different diffusion levels supported by the adjustable light diffusing material; and
a controller configured to, during the capture of the first image:
  adjust the variable diffusion level to the selected diffusion level, wherein the selected diffusion level is selected based, at least in part on, the selected zoom level for the camera arrangement,
  wherein:
    when the third field of view of the first image output by the camera arrangement corresponds with the first field of view, the selected diffusion level is a first diffusion level; and
    when the third field of view of the first image output by the camera arrangement corresponds with the second field of view, the selected diffusion level is a second diffusion level;
  wherein the controller is further configured to cause the one or more illumination elements to emit light that passes through the adjustable light diffusing material adjusted to the selected diffusion level to provide illumination to at least a portion of the third field of view,
  wherein:
    when the selected diffusion level is the first diffusion level, the provided illumination substantially fills the first field of view of the first lens system;
    when the selected diffusion level is the second diffusion level, the provided illumination substantially fills the second field of view of the second lens system; and
  wherein the controller is further configured to control the adjustable light diffusing material according to a selected control scheme selected from a set of control schemes comprising two or more of:
    a control scheme wherein an illumination field of the light source module is maintained within the third field of view;
    a control scheme wherein the third field of view is maintained within the illumination field; or
    a control scheme wherein the illumination field of view at least partially extends beyond the third field of view.

2. The mobile computing device of claim 1, wherein the second diffusion level is a minimum diffusion level of the plurality of different diffusion levels supported by the adjustable light diffusing material.

3. The mobile computing device of claim 2, wherein:
the second field of view corresponds to a particular zoom level of the camera arrangement that is less than a maximum zoom level; and
the controller is configured to select the second field of view for selected zoom levels greater than the particular zoom level.

4. The mobile computing device of claim 1, wherein the first diffusion level is a maximum diffusion level of the plurality of different diffusion levels supported by the adjustable light diffusing material.

5. The mobile computing device of claim 1, wherein the controller is configured to adjust an illumination intensity for the one or more illumination elements based, at least in part, on one or more of:
a received or determined distance to an object in the third field of view;
lighting conditions of a scene in the third field of view; or
the selected level of diffusion.

6. A light source module, comprising:
one or more illumination elements configured to emit light;
an adjustable light diffusing material configured to diffuse light emitted from the one or more illumination elements by a selected diffusion level; and
a controller configured to, during capture of an image by a camera arrangement comprising a first lens system and a second lens system:
  adjust the adjustable light diffusing material to the selected diffusion level, wherein the selected diffusion level is selected based, at least in part on, a field of view for the image being captured;
  control the adjustable light diffusing material according to a selected control scheme selected from a set of control schemes comprising two or more of:
    a control scheme wherein an illumination field of the light source module is maintained within the field of view of the image being captured;
    a control scheme wherein the field of view of the image being captured is maintained within the illumination field; or
    a control scheme wherein the illumination field of view at least partially extends beyond the field of view of the image being captured; and
  cause the one or more illumination elements to emit light that passes through the adjustable light diffusing material adjusted to the selected diffusion level and controlled according to the selected control scheme to provide illumination to the field of view of the image being captured according to the selected control scheme,
wherein the first lens system has a first field of view and the second lens system has a second field of view, and wherein the field of view of the image being captured comprises a combination of the first field of view and the second field of view.

7. The light source module of claim 6, wherein:
at least a portion of the second field of view overlaps the first field of view; and
at least a portion of the first field of view does not overlap the second field of view;
wherein:
when the field of view of the image being captured corresponds with the first field of view, the selected diffusion level is a first diffusion level; and
when the field of view of the image being capture corresponds with the second field of view, the selected diffusion level is a second diffusion level, and
wherein:
when the selected diffusion level is the first diffusion level, the provided illumination substantially fills the first field of view of the first lens system; and
when the selected diffusion level is the second diffusion level, the provided illumination substantially fills the second field of view of the second lens system.

8. The light source module of claim 7, wherein:
the second diffusion level is a minimum diffusion level of a plurality of different diffusion levels supported by the adjustable light diffusing material; and
the first diffusion level is a maximum diffusion level of the plurality of different diffusion levels supported by the adjustable light diffusing material.

9. The light source module of claim 7, wherein the second diffusion level is greater than a minimum diffusion level of a plurality of different diffusion levels supported by the adjustable light diffusing material.

10. The light source module of claim 6, wherein the adjustable light diffusing material is configured to decrease diffusion of light as an amount of electrical voltage applied to the adjustable light diffusing material is increased.

11. The light source module of claim 7, wherein the adjustable light diffusing material is configured such that when electrical voltage is not being applied to the adjustable light diffusing material the adjustable light diffusing material is in an opaque state.

12. The light source module of claim 6, wherein the adjustable light diffusing material comprises a polymer stabilized cholesteric texture (PSCT).

13. The light source module of claim 6, wherein the adjustable light diffusing material comprises smectic phase liquid crystals or a polymer network liquid crystal (PNLC) material.

14. The light source module of claim 6, wherein the controller is further configured to:
determine an illumination intensity for illumination of the field of view of the image being captured based at least in part on information relating to a camera sensor sensitivity setting from the camera arrangement.

15. The light source module of claim 6, wherein the controller is configured to select a control scheme from the set of control schemes based at least in part on a level of inclusion of the first field of view or the second field of view in the field of view of the image being captured.

16. A method comprising:
determining a combination of fields of view from two or more lens systems of a camera arrangement for inclusion in a field of view of an image being captured by the camera arrangement;
determining, based on the combination of fields of view, a level of diffusion to apply to light emitted from the one or more illumination elements via an adjustable light diffusing material, wherein the determined level of diffusion diffuses light emitted from the one or more illumination elements such that the light substantially fills field of view of the image being captured;
selecting a control scheme for controlling the adjustable light diffusing material from a set of control schemes comprising two or more of:
a control scheme wherein an illumination field is maintained within the field of view of the image being captured;
a control scheme wherein the field of view of the image being captured is maintained within the illumination field; or
a control scheme wherein the illumination field of view at least partially extends beyond the field of view of the image being captured; and
illuminating the field of view of the image to be captured according to the determined level of diffusion and using the selected control scheme.

17. The method of claim 16, further comprising:
determining a distance to an object in the field of view of the image to be captured based at least in part on auto-focus information from the camera arrangement, wherein the level of diffusion to apply is further based on the distance to the object.

18. The method of claim 16, further comprising:
determining an illumination intensity for the one or more illumination elements based at least in part on information relating to a camera sensor ISO (International Standards Organization) sensitivity setting.

* * * * *